US012661980B2

(12) United States Patent
   Tabata et al.

(10) Patent No.: US 12,661,980 B2
(45) Date of Patent: Jun. 23, 2026

(54) DRIVING APPARATUS FOR VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Yohei Habata, Susono (JP); Yuuki Makino, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 425 days.

(21) Appl. No.: 18/332,116

(22) Filed: Jun. 9, 2023

(65) Prior Publication Data

US 2023/0415569 A1      Dec. 28, 2023

(30) Foreign Application Priority Data

Jun. 27, 2022    (JP) ................................. 2022-103051

(51) Int. Cl.
   B60K 17/346          (2006.01)
   B60K 6/365          (2007.10)
         (Continued)
(52) U.S. Cl.
   CPC ............ B60K 17/3462 (2013.01); B60K 6/52
      (2013.01); F16H 48/36 (2013.01); B60K 6/365
                        (2013.01);
         (Continued)

(58) Field of Classification Search
   CPC ...... B60K 17/3462; B60K 6/52; B60K 6/365;
            B60K 17/346; B60K 17/3467;
      (Continued)

(56) References Cited

U.S. PATENT DOCUMENTS 4,635,744 A  *  1/1987  Hiraiwa ............. B60K 17/3467
                                           180/247
5,042,610 A  *  8/1991  Shiraishi ............. B60K 17/346
                                           475/221
      (Continued)

FOREIGN PATENT DOCUMENTS

JP          2020-192828 A    12/2020
JP          2021-131153 A     9/2021

*Primary Examiner* — Timothy Wilhelm
(74) *Attorney, Agent, or Firm* — Oblon, McClelland, Maier & Neustadt, L.L.P.

(57)          ABSTRACT

A vehicle driving apparatus includes: (a) a power distribution device for distributing a power between a pair of front wheels and a pair of rear wheels; (b) a differential device for distributing the power between right and left wheels that constitute one of the pair of front wheels and the pair of rear wheels; and (c) a propeller shaft for transmitting the power to the other of the pair of front wheels and the pair of rear wheels. The power distribution device includes a first rotary element connected to a rotating machine, a second rotary element connected to the differential device and a third rotary element connected to the propeller shaft. The third rotary element and the propeller shaft are both connected to a power transmission member between the power distribution device and one of the right and left wheels in an axial direction of the power distribution device.

3 Claims, 13 Drawing Sheets

(51) Int. Cl.
  B60K 6/52      (2007.10)
  F16H 48/10     (2012.01)
  F16H 48/22     (2006.01)
  F16H 48/36     (2012.01)

(52) U.S. Cl.
  CPC ........... *B60Y 2200/92* (2013.01); *F16H 48/10*
      (2013.01); *F16H 48/22* (2013.01); *F16H*
      *2048/364* (2013.01); *Y02T 10/62* (2013.01)

(58) Field of Classification Search
  CPC ........... B60K 6/485; B60K 2006/4808; B60K
      2006/4841; B60K 2006/381; B60K
      2006/4833; B60K 6/387; B60K 6/448;
      B60K 6/547; F16H 48/36; F16H 48/10;
      F16H 48/22; F16H 2048/364; F16H
      2200/2066; F16H 2003/445; F16H
      2200/2007; F16H 2200/2041; F16H
      48/08; B60Y 2200/92; Y02T 10/62
  See application file for complete search history.

(56)                References Cited

U.S. PATENT DOCUMENTS

| | | | | | |
|---|---|---|---|---|---|
| 5,071,396 | A | * | 12/1991 | Kobayashi | B60K 23/0808 |
| | | | | | 475/221 |
| 5,246,408 | A | * | 9/1993 | Kobayashi | B60K 17/3467 |
| | | | | | 475/221 |
| 5,248,284 | A | * | 9/1993 | Kobayashi | F16H 48/22 |
| | | | | | 475/86 |
| 5,254,052 | A | * | 10/1993 | Kobayashi | B60K 17/3467 |
| | | | | | 475/221 |
| 6,076,623 | A | * | 6/2000 | Teraoka | B60K 17/346 |
| | | | | | 180/250 |
| 6,523,633 | B1 | * | 2/2003 | Teraoka | B60K 17/04 |
| | | | | | 180/248 |
| 8,371,413 | B2 | * | 2/2013 | Hayashi | B60K 6/52 |
| | | | | | 180/242 |
| 8,545,359 | B2 | * | 10/2013 | Kato | F16H 48/30 |
| | | | | | 475/204 |
| 9,248,732 | B2 | * | 2/2016 | Honda | F16H 48/36 |
| 9,352,647 | B2 | * | 5/2016 | Ibusuki | B60W 10/06 |
| 9,494,218 | B2 | * | 11/2016 | Honda | F16H 48/36 |
| 9,517,689 | B2 | * | 12/2016 | Piazza | B60K 6/48 |
| 9,573,457 | B2 | * | 2/2017 | Piazza | B60K 6/387 |
| 9,579,964 | B2 | * | 2/2017 | Piazza | B60K 6/48 |
| 9,925,871 | B2 | * | 3/2018 | Tamura | B60K 23/0808 |
| 9,950,607 | B2 | * | 4/2018 | Littlefield | B60K 6/365 |
| 10,738,859 | B2 | * | 8/2020 | Nilsson | F16H 3/724 |
| 11,225,140 | B2 | * | 1/2022 | Ono | B60K 23/04 |
| 11,440,548 | B2 | * | 9/2022 | Tabata | B60K 17/348 |
| 11,548,496 | B2 | * | 1/2023 | Otsuki | B60K 6/48 |
| 11,912,125 | B2 | * | 2/2024 | Omuro | B60K 23/0808 |
| 11,993,243 | B2 | * | 5/2024 | Kawamata | B60W 10/119 |
| 12,059,957 | B2 | * | 8/2024 | Tabata | B60W 30/1882 |
| 12,090,990 | B2 | * | 9/2024 | Tabata | B60W 30/1882 |
| 12,157,364 | B2 | * | 12/2024 | Tabata | B60W 10/08 |
| 2010/0234158 | A1 | * | 9/2010 | Kato | F16H 48/30 |
| | | | | | 475/1 |
| 2020/0298699 | A1 | * | 9/2020 | Kuwabara | B60K 6/405 |
| 2021/0260995 | A1 | | 8/2021 | Akiyama et al. | |

* cited by examiner

FORWARD DIRECTION

LONGITUDINAL DIRECTION

LEFT-WHEEL SIDE ←——→ RIGHT-WHEEL SIDE

WIDTH DIRECTION

REVERSE DIRECTION

FIG.4

| NUMBER | MODE | BF1 | CF1 | CD1 |
|--------|------|-----|-----|-----|
| m1 | BEV (FF) HIGH | | O | |
| m2 | BEV (FF) LOW | O | | |
| m3 | BEV_LSD | | O | O SLIP CONTROL |
| m4 | BEV_Lock | | O | O |
| m5 | FIRST POWER SOURCE TORQUE SPLIT | | | O |
| m6 | FIRST POWER SOURCE LSD | | O SLIP CONTROL | O |
| m7 | FIRST POWER SOURCE Lock | | O | O |
| m8 | FIRST POWER SOURCE TWO-WHEEL DRIVE (FR) | | | |

FIG.8

| NUMBER | MODE | BF1 | CF1 | CD1 |
|---|---|---|---|---|
| m1 | BEV(FR) HIGH | | O | |
| m2 | BEV(FR) LOW | O | | |
| m3 | BEV_LSD | | O | O SLIP CONTROL |
| m4 | BEV_Lock | | O | O |
| m5 | FIRST POWER SOURCE TORQUE SPLIT | | | O |
| m6 | FIRST POWER SOURCE LSD | | O SLIP CONTROL | O |
| m7 | FIRST POWER SOURCE Lock | | O | O |
| m8 | FIRST POWER SOURCE TWO-WHEEL DRIVE (FF) | | | |

FIG.12

| NUMBER | MODE | BF1 | CF1 | CD1 |
|---|---|---|---|---|
| m1 | BEV (FF) HIGH | | O | |
| m2 | BEV (FF) LOW | O | | |
| m3 | BEV_LSD | | O | O SLIP CONTROL |
| m4 | BEV_Lock | | O | O |
| m5 | FIRST POWER SOURCE TORQUE SPLIT | | | O |
| m6 | FIRST POWER SOURCE LSD | | O SLIP CONTROL | O |
| m7 | FIRST POWER SOURCE Lock | | O | O |
| m8 | FIRST POWER SOURCE TWO-WHEEL DRIVE (FF) | | | |

DRIVING APPARATUS FOR VEHICLE

This application claims priority from Japanese Patent Application No. 2022-103051 filed on Jun. 27, 2022, the disclosure of which is herein incorporated by reference in its entirety.

FIELD OF THE INVENTION

The present invention relates to a driving apparatus for a vehicle, wherein the driving apparatus includes a power distribution device configured to distribute a power to front and rear wheels of the vehicle.

BACKGROUND OF THE INVENTION

There is well known a driving apparatus for a vehicle that includes a pair of front wheels and a pair of rear wheels, wherein the driving apparatus includes: (a) a power source; (b) a power distribution device configured to distribute a power of the power source between the pair of front wheels and the pair of rear wheels; (c) a differential device configured to distribute the power between right and left wheels that constitute one of the pair of front wheels and the pair of rear wheels; (d) a pair of drive shafts configured to transmit the power to the respective right and left wheels; and (e) a propeller shaft configured to transmit the power to the other of the pair of front wheels and the pair of rear wheels, wherein the power distribution device is provided with a differential mechanism that includes a rotating machine, a first rotary element connected to the rotating machine, a second rotary element connected to the differential device and a third rotary element connected to the differential mechanism. As an example of such a driving apparatus, JP-2021-131153A discloses a power transmission device.

SUMMARY OF THE INVENTION

By the way, in the power transmission device disclosed in the above-identified Japanese Patent Application Publication, the power distribution device is disposed longitudinally. That is, in the vehicle driving apparatus, the disclosed power transmission device has a longitudinal arrangement in which the power distribution device is disposed on an axis that is parallel to a longitudinal direction of the vehicle. Where the power distribution device is disposed laterally, namely, where the power distribution device is disposed to be coaxial with a pair of drive shafts that extend in a width direction of the vehicle orthogonal to the longitudinal direction of the vehicle, the driving apparatus needs to be made compact in size.

The present invention was made in view of the background art described above. It is therefore an object of the present invention to provide a driving apparatus for a vehicle, which is capable of being made compact in size, where a power distribution device is disposed laterally.

The object indicated above is achieved according to the following aspects of the present invention.

According to a first aspect of the invention, there is provided a driving apparatus for a vehicle that includes a pair of front wheels and a pair of rear wheels. The driving apparatus includes: (a) a power source; (b) a power distribution device configured to distribute a power of the power source between the pair of front wheels and the pair of rear wheels; (c) a differential device configured to distribute the power between right and left wheels that constitute one of the pair of front wheels and the pair of rear wheels; (d) a pair of drive shafts configured to transmit the power to the respective right and left wheels; and (e) a propeller shaft configured to transmit the power to the other of the pair of front wheels and the pair of rear wheels. The power distribution device is provided with a rotating machine and a differential mechanism that includes a first rotary element connected to the rotating machine, a second rotary element connected to the differential device and a third rotary element connected to the propeller shaft. The power distribution device is disposed to be coaxial with the pair of drive shafts. The driving apparatus further includes (f) a power transmission member which is disposed to be coaxial with the pair of drive shafts, and which is configured to transmit the power of the power source to the third rotary element. The third rotary element and the propeller shaft are both connected to the power transmission member in an area located between the power distribution device and one of the right and left wheels in an axial direction of the power distribution device.

According to a second aspect of the invention, in the driving apparatus according to the first aspect of the invention, there is further provided an engagement device configured to selectively connect between the third rotary element and the propeller shaft, and between the third rotary element and the power transmission member.

According to a third aspect of the invention, there is provided a driving apparatus for a vehicle that includes a pair of front wheels and a pair of rear wheels. The driving apparatus includes: (a) a power source; (b) a power distribution device configured to distribute a power of the power source between the pair of front wheels and the pair of rear wheels; (c) a differential device configured to distribute the power between right and left wheels that cooperate to constitute one of the pair of front wheels and the pair of rear wheels; (d) a pair of drive shafts configured to transmit the power to the respective right and left wheels; and (e) a propeller shaft configured to transmit the power to the other of the pair of front wheels and the pair of rear wheels. The power distribution device is provided with a rotating machine and a differential mechanism that includes a first rotary element connected to the rotating machine, a second rotary element connected to the differential device and a third rotary element connected to the propeller shaft. The power distribution device is disposed to be coaxial with the pair of drive shafts. The driving apparatus further includes (f) a power transmission member which is disposed to be coaxial with the pair of drive shafts, and which is configured to transmit the power of the power source to the second rotary element. The second rotary element and the differential device are both connected to the power transmission member in an area located between the power distribution device and one of the right and left wheels in an axial direction of the power distribution device.

According to a fourth aspect of the invention, in the driving apparatus according to the third aspect of the invention, there is further provided an engagement device configured to selectively connect between the second rotary element and the differential device, and between the second rotary element and the power transmission member.

According to a fifth aspect of the invention, in the driving apparatus according to the third aspect of the invention, there is further provided an engagement device configured to selectively connect between the third rotary element and the propeller shaft.

In the driving apparatus according to the first aspect of the invention, the third rotary element and the propeller shaft are both connected to the power transmission member in the area located between the power distribution device and one of the right and left wheels in the axial direction of the power distribution device, wherein the power transmission member is disposed to be coaxial with the pair of drive shafts, and is configured to transmit the power of the power source to the third rotary element. This arrangement enables the driving apparatus to be made compact in size, wherein the power distribution device is disposed laterally.

In the driving apparatus according to the second aspect of the invention, the engagement device is provided to selectively connect between the third rotary element and the propeller shaft, and between the third rotary element and the power transmission member. Therefore, it is possible to switch between an all-wheel drive and a two-wheel drive (i.e., rear-wheel drive or front-wheel drive), and to simplify a construction for cutting off a power transmission from the power source to the power distribution device and to the differential device.

In the driving apparatus according to the third aspect of the invention, the second rotary element and the differential device are both connected to the power transmission member in the area located between the power distribution device and one of the right and left wheels in the axial direction of the power distribution device, wherein the power transmission member is disposed to be coaxial with the pair of drive shafts, and is configured to transmit the power of the power source to the second rotary element. This arrangement enables the driving apparatus to be made compact in size, wherein the power distribution device is disposed laterally in the driving apparatus.

In the driving apparatus according to the fourth aspect of the invention, the engagement device is provided to selectively connect between the second rotary element and the differential device, and between the second rotary element and the power transmission member. Therefore, it is possible to switch between the all-wheel drive and the two-wheel drive (i.e., rear-wheel drive or front-wheel drive), and to simplify the construction for cutting off the power transmission from the power source to the power distribution device and to the propeller shaft.

In the driving apparatus according to the fifth aspect of the invention, the engagement device is provided to selectively connect between the third rotary element and the propeller shaft. Therefore, it is possible to switch between the all-wheel drive and the two-wheel drive (i.e., rear-wheel drive or front-wheel drive), and to simplify the construction for cutting off the power transmission from the power source to the propeller shaft.

BRIEF DESCRIPTION OF THE DRAWINGS

FIG. 4 is a table indicating a relationship between each mode established in the transfer shown in FIG. 2 and operation states of respective engagement devices in the transfer;

FIG. 8 is a table indicating a relationship between each mode established in the transfer shown in FIG. 6 and operation states of respective engagement devices in the transfer;

FIG. 12 is a table indicating a relationship between each mode established in the transfer shown in FIG. 10 and operation states of respective engagement devices in the transfer.

DETAILED DESCRIPTION OF PREFERRED EMBODIMENTS

Hereinafter, preferred embodiments of the invention will be described in detail with reference to the accompanying drawings.

First Embodiment

Figure 1:
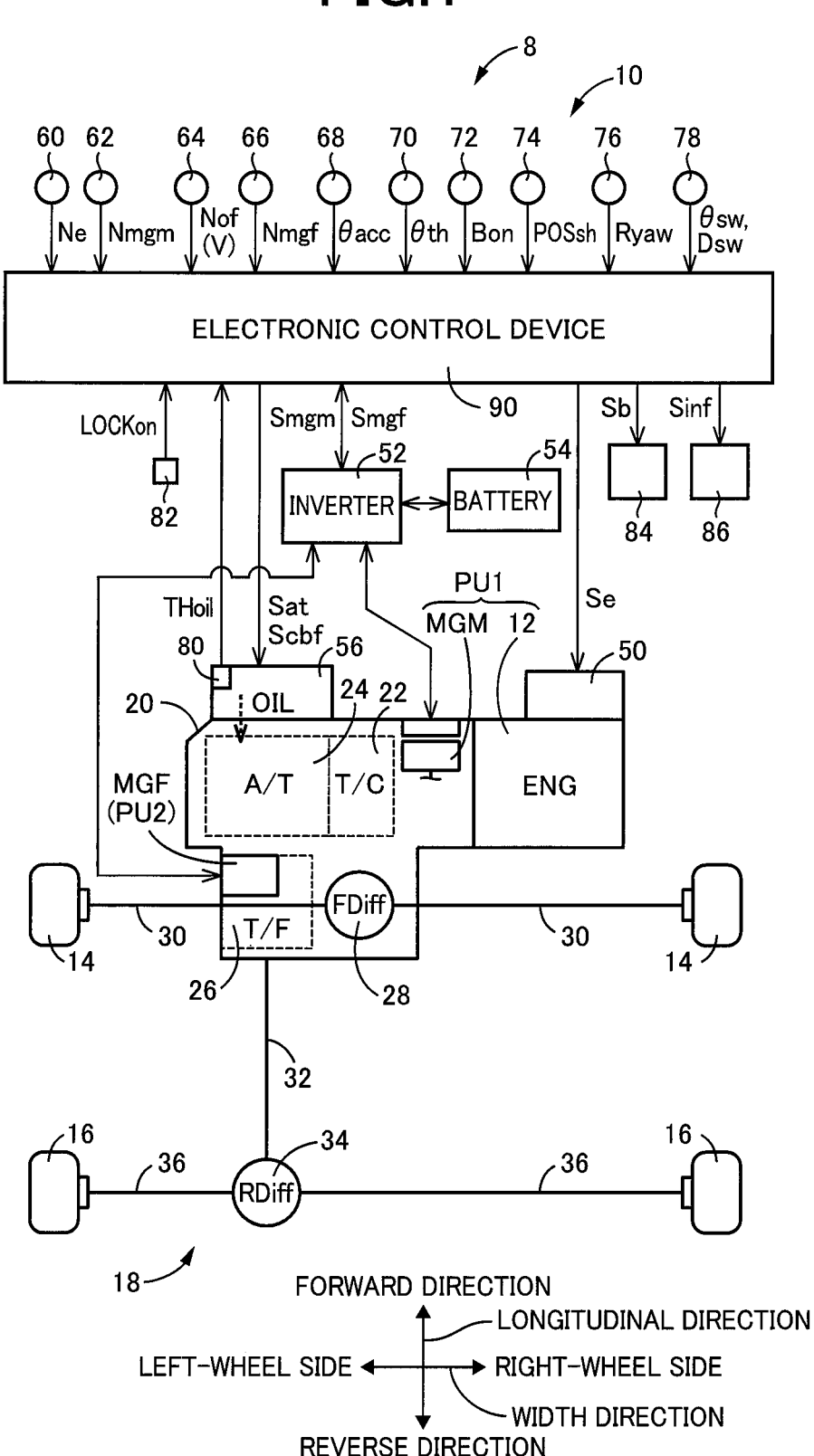
FIG. 1 is a view schematically showing a construction of a vehicle driving apparatus to which the present invention is applied, for explaining major control functions and control portions provided for performing various control operations in the driving apparatus.

FIG. 1 is a view schematically showing a construction of a vehicle driving apparatus 10 to which the present invention is applied, for explaining major control functions and control portions provided for performing various control operations in the driving apparatus 10. As shown in FIG. 1, the driving apparatus 10 includes power sources in the form of an engine 12 (that is represented by "ENG" in FIG. 1), a TM rotating machine MGM and a TF rotating machine MGF. Thus, a vehicle 8, in which the driving apparatus 10 is to be provided, is a hybrid vehicle having right and left front wheels (a pair of front wheels) 14 and right and left rear wheels (a pair of rear wheels) 16. The driving apparatus 10 includes a power transmission device 18 configured to transmit powers of the power sources such as the engine 12, to the front and rear wheels 14, 16.

The TF rotating machine MGF is a rotating machine provided in a transfer 26 that will be described later. The engine 12 and the TM rotating machine MGM constitute a power source which is not provided in the transfer 26 and corresponds to a first power source PU1. The TM rotating machine MGM corresponds to a first rotating machine. The TF rotating machine MGF corresponds to a second rotating machine, and corresponds to a second power source PU2 that is to be used as another power source, in place of or in addition to the first power source PU1, to drive the vehicle 8.

The vehicle 8 is an all-wheel drive vehicle capable of distributing a part of a torque, which is transmitted by the driving apparatus 10 to the rear wheels 16, to the front wheels 14. The driving apparatus 10 is capable of performing a rear-wheel drive by which the torque is transmitted only to the rear wheels 16 and also a front-wheel drive by which the torque is transmitted only to the front wheels 14. The vehicle 8 is also a four-wheel drive vehicle having four wheels consisting of the pair of front wheels 14 and the pair of rear wheels 16. In the description of the present embodiment, an all-wheel drive (=AWD) is synonymous with a four-wheel drive (=4WD). Each of the rear-wheel drive and the front-wheel drive is a two-wheel drive (=2WD).

The engine 12 is a known internal combustion engine such as gasoline engine and diesel engine. The driving apparatus 10 is provided with an engine control device 50 that includes a throttle actuator, a fuel injection device and an ignition device. With the engine control device 50 being controlled by an electronic control device 90 that is described below, an engine torque Te, which is an output torque of the engine 12, is controlled.

Each of the TM rotating machine MGM and the TF rotating machine MGF is an electric motor serving as a known motor generator, and is a rotary electric machine having a function serving as a motor for generating a mechanical power from an electric power and also a function serving a generator for generating an electric power from a mechanical power. Each of the TM rotating machine MGM and the TF rotating machine MGF is connected to a battery 54 via an inverter 52, wherein the battery 54 and the inverter 52 are both provided in the driving apparatus 10. With the inverter 52 being controlled by the electronic control device 90 that is described below, an MGM torque Tmgm as an output torque of the TM rotating machine MGM and an MGF torque Tmgf as an output torque of the TF rotating machine MGF are controlled. Each of the MGM torque Tmgm and the MGF torque Tmgf serves as a power driving torque (that may be referred also to as "motor torque") when a corresponding one of the TM rotating machine MGM and the TF rotating machine MGF functions as the motor, and serves as a regenerative torque (that may be referred also to as "power generation torque") when a corresponding one of the TM rotating machine MGM and the TF rotating machine MGF functions as the generator. The battery 54 is a power storage device to and from which the electric power is to be supplied from and to each of the TM rotating machine MGM and the TF rotating machine MGF. The above-described electric power corresponds to an electric energy, unless otherwise specified. Similarly, the above-described power corresponds to a drive power, a torque and a force, unless otherwise specified.

The power transmission device 18 includes a casing 20 as a transaxle casing that is a fixed member (non-rotary member). The power transmission device 18 further includes a torque converter 22 (see "T/C" in FIG. 1), an automatic transmission 24 (see "A/T" in FIG. 1), a transfer 26 (see "T/F" in FIG. 1) and a front differential device 28 (see "FDiff" in FIG. 1) that are disposed within the casing 20. The power transmission device 18 still further includes right and left front drive shafts 30, a rear propeller shaft 32, a rear differential device 34 (see "RDiff" in FIG. 1) and right and left rear drive shafts 36. The TM rotating machine MGM is also provided within the casing 20.

In the driving apparatus 10, the torque converter 22 and the automatic transmission 24 configured to transmit the power of the first power source PU1 to the transfer 26. The transfer 26 serves as a power distribution device configured to distribute the power of the first power source PU1, between the pair of front wheels 14 and the pair of rear wheels 16. The front differential device 28 serves as a differential device configured to distribute the power between right and left wheels that constitute the pair of front wheels 14 as one of the pair of front wheels 14 and the pair of rear wheels 16. The right and left front drive shafts 30 serve as a pair of drive shafts configured to transmit the power to the respective right and left wheels that constitute the pair of front wheels 14. The rear propeller shaft 32 serves as a propeller shaft configured to transmit the power to the right and left rear wheels 16 as the other of the pair of front wheels 14 and the pair of rear wheels 16. The rear differential device 34 serves as another differential device configured to distribute the power between the right and left rear wheels 16 as the other of the pair of front wheels 14 and the pair of rear wheels 16. The right and left rear drive shafts 36 serve as another pair of drive shafts configured to transmit the power to the respective right and left rear wheels 16

Figure 2:
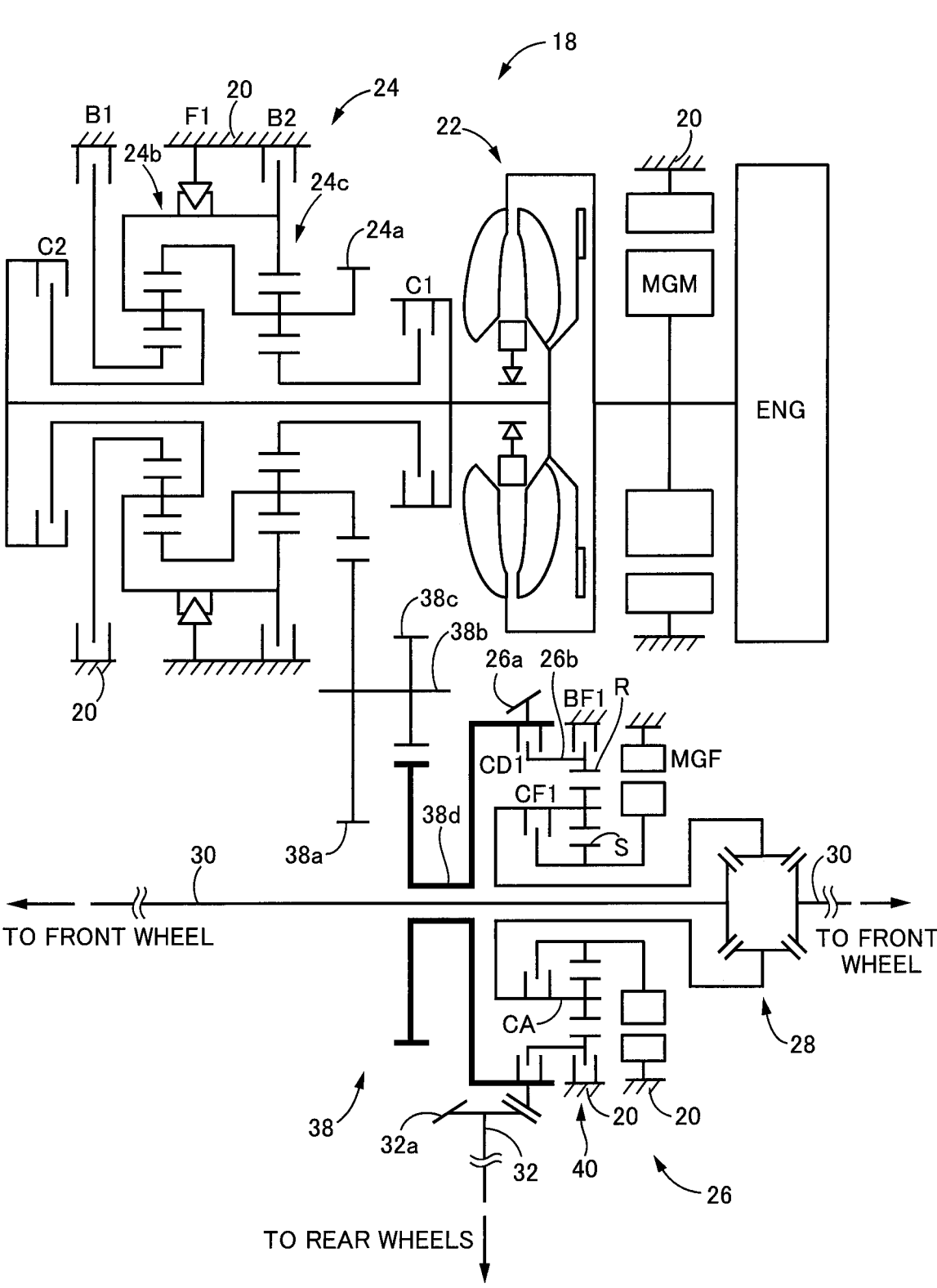
FIG. 2 is a view schematically showing a construction of a power transmission device shown in FIG. 1, which is according to a first embodiment of the present invention.

FIG. 2 is a view schematically showing a construction of the power transmission device 18. As shown in FIG. 2, the torque converter 22 and the automatic transmission 24 are arranged coaxially with the engine 12 and the TM rotating machine MGM, and are disposed on a power transmission path between the first power source PU1 and the transfer 26. The automatic transmission 24 is disposed on a power transmission path between the torque converter 22 and the transfer 26. The TM rotating machine MGM is connected to a power transmission path between the engine 12 and the torque converter 22, in a power transmittable manner.

The power transmission device 18 includes a reduction gear mechanism 38 that is connected to an AT output gear 24a that is an output rotary member of the automatic transmission 24. The reduction gear mechanism 38 includes a driven gear 38a which is meshed with the AT output gear 24a, a driven shaft 38b on which the driven gear 38a disposed unrotatably relative to the driven shaft 38b, a final gear 38c which is disposed unrotatably relative to the driven shaft 38b, and a TF input gear 38d which is meshed with the final gear 38c. The final gear 38c has a diameter smaller than the driven gear 38a. The TF input gear 38d is connected to the transfer 26. The automatic transmission 24 and the transfer 26 are connected to each other through the reduction gear mechanism 38.

The automatic transmission 24 is a known automatic transmission of planetary gear type that includes, for example, a plurality of planetary gear devices in the form of first and second planetary gear devices 24b, 24c, and a plurality of engagement devices in the form of a one-way clutch F1, clutches C1, C2 and brakes B1, B2. Each of the engagement devices is a known hydraulically-operated frictional engagement device. The automatic transmission 24 is configured to establish one of four forward gear positions, for example, with a corresponding one or ones of the engagement devices being engaged, wherein the one of the four forward gear positions is selected by the electronic control device 90, depending on a running speed V of the vehicle 8 and an accelerating operation made by a driver of the vehicle 8, for example.

The transfer 26 includes a TF rotating machine MGF, a differential mechanism 40, a TF clutch CF1, a TF brake BF1, a switching clutch CD1, a TF output gear 26a and a TF transmission member 26b that are disposed on a common rotation axis that is coaxial with the pair of front drive shafts 30. That is, the transfer 26 is disposed to be coaxial with the pair of front drive shafts 30.

Each of the TF clutch CF1, the TF brake BF1 and the switching clutch CD1 is a known wet-type hydraulically-operated frictional engagement device constituted by a multiple-disc type or single-disc type clutch that is to be pressed by a hydraulic actuator. A controlled state or operation state of the TF clutch CF1 is switched among various states, for example, with change of a CF1 torque Tcf1 that is a torque capacity of the TF clutch CF1, wherein the change of the CF1 torque Tcf1 is made by a CF1 pressure PRcf1 that is a hydraulic pressure of the TF clutch CF1 supplied and regulated by a hydraulic control unit (hydraulic control circuit) 56 (see FIG. 1) provided in the driving apparatus 10, and wherein the various states include a released state (that may be referred also to as a fully released state) in which the TF clutch CF1 is fully released, a slip state (that may be referred also to as a slip-engaged state) in which the TF clutch CF1 is engaged with its slipping and an engaged state (that may be referred also to as a fully engaged state) in which the TF clutch CF1 is fully engaged. A controlled state or operation state of the TF brake BF1 is also switched among various states, for example, with a BF1 torque Tbf1 being changed by a BF1 pressure PRbf1 supplied from the hydraulic control unit 56, as the operation state of the TF clutch CF1. A controlled state or operation state of the switching clutch CD1 is also switched among various states, for example, with a CD1 torque Tcd1 being changed by a CD1 pressure PRcd1 supplied from the hydraulic control unit 56, as the operation state of the TF clutch CF1. The hydraulic control unit 56 is controlled by the electronic control device 90.

The TF output gear 26a is connected to the TF input gear 38d. The TF transmission member 26b is connected at its one side portion with the differential mechanism 40 in a power transmittable manner, and is connected at its another side portion with the TF input gear 38d and the TF output gear 26a through the switching clutch CD1 in a power transmittable manner. As the transfer 26, the TF input gear 38d is disposed to be coaxial with the pair of front drive shafts 30.

The TF output gear 26a and a PS gear 32a of the rear propeller shaft 32 cooperate with each other to constitute a pair of bevel gears, so that the TF output gear 26a is connected to the rear propeller shaft 32 in a power transmittable manner. Thus, the power of the first power source PU1 is transmitted from the TF input gear 38d to the rear propeller shaft 32 through the pair of bevel gears (26a, 32a).

The differential device 40 is constituted by a single-pinion-type planetary gear device, and includes a sun gear S, a carrier CA and a ring gear R. The TF rotating machine MGF is connected to the sun gear S in a power transmittable manner. The carrier CA is connected to the front differential device 28. The ring gear R is selectively connected to the casing 20 through the TF brake BF1. Further, the TF transmission member 26b is connected to the ring gear R, such that the ring gear R is selectively connected to the TF input gear 38d and the TF output gear 26a through the switching clutch CD1. That is, the ring gear R is selectively connected to the rear propeller shaft 32 through the switching clutch CD1.

In the transfer 26, with the switching clutch CD1 being placed in the engaged state or slip state, a part of the power from the TF input gear 38d is inputted to the ring gear R of the differential mechanism 40, for example. The sun gear S and the carrier CA are selectively connected to each other through the TF clutch CF1. The TF clutch CF1 is an engagement device configured to selectively connect between the sun gear S and the carrier CA. The TF brake BF1 is an engagement device configured to selectively connect the ring gear R to the casing 20.

Figure 3:
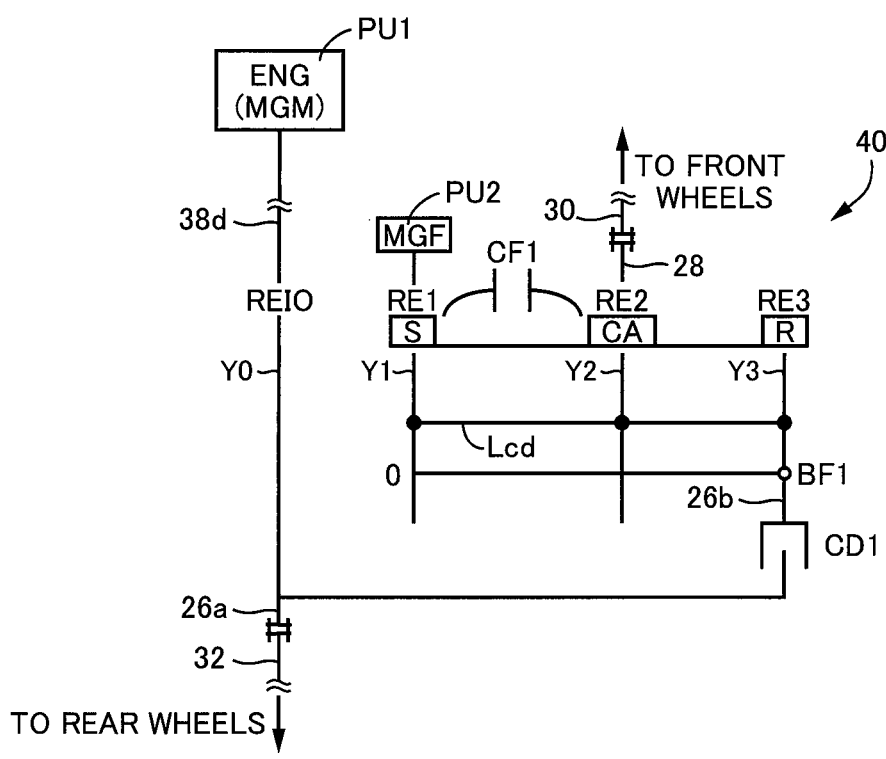
FIG. 3 is a collinear chart indicating a relationship among rotational speeds of rotary elements of a transfer shown in FIG. 2.

FIG. 3 is a collinear chart indicating a relationship among rotational speeds of rotary elements of the transfer 26. In FIG. 3, three vertical lines Y1, Y2, Y3 corresponding to the three rotary elements of the differential mechanism 40 constituting the transfer 26 are an axis representative of a rotational speed of the sun gear S corresponding to a first rotary element RE1, an axis representative of a rotational speed of the carrier CA corresponding to a second rotary element RE2, and an axis representative of a rotational speed of the ring gear R corresponding to a third rotary element RE3, in order from the left side. Further, in FIG. 3, a vertical line Y0, which is located on a left side of the vertical line Y1, is an axis representative of a rotational speed of the TF input gear 38d and the TF output gear 26a corresponding to an input/output rotary element REIO.

As shown in the collinear chart of FIG. 3, in the transfer 26, the input/output rotary element REIO is selectively connected to the ring gear R through the switching clutch CD1, and is connected to the rear propeller shaft 32. Further, the input/output rotary element REIO is connected to the first power source PU1 through the torque converter 22 and the automatic transmission 24 in a power transmittable manner.

In the differential mechanism 40, the TF rotating machine MGF is connected to the first rotary element RE1 in a power transmittable manner. The front differential device 28 is connected to the second rotary element RE2. The third rotary element RE3 is selectively connected to the TF output gear 26a, i.e., the rear propeller shaft 32, through the switching clutch CD1, and is selectively connected to the casing 20 through the TF brake BF1. The third rotary element RE3 is further selectively connected to the TF input gear 38d through the switching clutch CD1. The TF input gear 38d is a power transmission member configured to the power of the first power source PU1 to the third rotary element RE3. The switching clutch CD1 is an engagement device configured to selectively connect between the third rotary element RE3 and the rear propeller shaft 32, and between the third rotary element RE3 and the TF input gear 38d. The TF clutch CF1 is an engagement device configured to selectively connect between two of the first, second and third rotary elements RE1, RE2 and RE3, although being configured to selectively connect between the first and second rotary elements RE1 and RE2 in the present embodiment. In the differential mechanism 40, the relationship among the rotational speeds of the respective first, second and third rotary elements RE1, RE2 and RE3 is represented by a straight line Lcd in FIG. 3.

In the differential mechanism 40, the first, second and third rotary elements RE1, RE2 and RE3 are integrally rotated, with the TF clutch CF1 being in the engaged state and with the TF brake BF1 being in the released state. On the other hand, in the differential mechanism 40, a rotational speed of the second rotary element RE2 is reduced relative to a rotational speed of the first rotary element RE1, with the TF clutch CF1 being in the released state and with the TF brake BF1 being in the engaged state. Thus, with the TF clutch CF1 and the TF brake BF1 being added to the differential mechanism 40, the differential mechanism 40 serves as a transmission device configured to selectively establish a high gear position and a low gear position, such that the high gear position is established with the TF clutch CF1 being placed in the engaged state and such that the low gear position is established with the TF brake BF1 being placed in the engaged state.

Further, the differential mechanism 40 is capable of providing a differential effect, with both of the TF clutch CF1 and the TF brake BF1 being placed in the released states. Thus, the differential mechanism 40 serves as a central differential device. In this instance in which the TF clutch CF1 and the TF brake BF1 are both in the released states, with the switching clutch CD1 being placed in the engaged state or slip state, the differential mechanism 40 is capable of distributing the torque inputted to the third rotary element RE3 from the first power source PU1, to the second rotary element RE2, owing to a reaction torque of the TF rotating machine MGF that is connected to the first rotary element RE1. Further, the differential mechanism 40 is capable of distributing the torque inputted to the third rotary element RE3 from the first power source PU1, to the second rotary element RE2, by limiting the differential effect of the differential mechanism 40, by placing the TF clutch CF1 in the slip state or engaged state in place of applying the reaction torque of the TF rotating machine MGF. Thus, the transfer 26 serves as a torque distribution device configured to distribute a part of the torque transmitted to the TF input gear 38*d* from the first power source PU1, to the front differential device 28. Thus, in the transfer 26, the torque can be distributed between the pair of front wheels 14 and the pair of rear wheels 16.

FIG. 4 is a table indicating a relationship between each mode established in the transfer 26 and the operation states of the respective engagement devices in the transfer 26. In FIG. 4, "○" indicates that the corresponding engagement device is in the engaged state, blank indicates that the corresponding engagement device is in the released state, and "○ slip control" indicates that the corresponding engagement device is in the slip state, namely, is subject to a slip control.

FIG. 8 shows eight modes numbered from m1 to m6. Each of "BEV (FF) HIGH" mode of number m1 and "BEV (FF) LOW" mode of number m2 is established with a corresponding one of the TF clutch CF1 and the TF brake BF1 being placed in the engaged state and with the switching clutch CD1 being placed in the released state. Each of "BEV (FF) HIGH" mode and "BEV (FF) LOW" mode is a mode for transmitting the power of the TF rotating machine MGF toward the front wheels 14 in the differential mechanism 40 in which the high gear position is established with the TF clutch CF1 being placed in the engaged state or the low gear position is established with the TF brake BF1 being placed in the engaged state. Each of "BEV (FF) HIGH" mode and "BEV (FF) LOW" mode is a motor driving mode (=BEV driving mode) for enabling a motor running (=BEV running) of the vehicle 8 using only the TF rotating machine MGF as the power source while stopping operation of the first power source PU1, for example. The BEV running of the vehicle 8 in each of the "BEV (FF) HIGH" mode and "BEV (FF) LOW" mode is performed by a front-wheels drive running of the vehicle 8.

"BEV_LSD" mode of number m3 is established with the TF clutch CF1 being placed in the engaged state, with the TF brake BF1 being placed in the released state and with the switching clutch CD1 being subject to the slip control. The "BEV_LSD" mode is also the BEV driving mode. The "BEV_LSD" mode is a mode for distributing the torque of the TF rotating machine MGF between the pair of front wheels 14 and the pair of rear wheels 16 at a desired ratio that is dependent on the torque capacity of the switching clutch CD1, with the differential mechanism 40 being placed in a state corresponding to the high gear position. That is, in the "BEV_LSD" mode, by adjusting the torque capacity of the switching clutch CD1 in the BEV driving mode, an AWD running with the torque distribution ratio Rx being desirably changeable is enabled.

The torque distribution ratio Rx is a ratio of distribution of the torque of the power sources (engine 12, TM rotating machine MGM, TF rotating machine MGF), between the pair of front wheels 14 and the pair of rear wheels 16. The torque distribution ratio Rx may be represented by a rear-wheel-side distribution ratio Xr that is a ratio of the torque transmitted to the rear wheels 16 from the power sources, to the total toque transmitted to the front and rear wheels 14, 16 from the power sources. Alternatively, the torque distribution ratio Rx may be represented by a front-wheel-side distribution ratio Xf (=1−Xr) that is a ratio of the torque transmitted to the front wheels 14 from the power sources, to the total toque transmitted to the front and rear wheels 14, 16 from the power sources.

"BEV_Lock" mode of number m4 is established with the TF clutch CF1 being placed in the engaged state, with the TF brake BF1 being placed in the released state and with the switching clutch CD1 being placed in the engaged state. The "BEV_Lock" mode is also the BEV driving mode. The "BEV_Lock" mode is a mode for distributing the torque of the TF rotating machine MGF between the pair of front wheels 14 and the pair of rear wheels 16 at a fixed ratio, with the differential mechanism 40 being placed in a differential lock state. That is, in the "BEV_Lock" mode, the AWD running with the torque distribution ratio Rx being fixed to 50 [%], for example, is enabled in the BEV driving mode.

In each BEV driving mode, namely, in each of the "BEV (FF) HIGH" mode, "BEV (FF) LOW" mode, "BEV_LSD" mode and "BEV_Lock" mode, it is possible to avoid drag of the engine 12 that is stopped, for example, by placing the automatic transmission 24 in a neutral state in which power transmission is cut off.

"FIRST POWER SOURCE TORQUE SPLIT" mode of number m5 is established with both of the TF clutch CF1 and the TF brake BF1 being placed in the released states and with the switching clutch CD1 being placed in the engaged state. The "FIRST POWER SOURCE TORQUE SPLIT" mode is a mode for distributing the torque between the pair of front wheels 14 and the pair of rear wheels 16 at a desired ratio that is dependent on the reaction torque of the TF rotary electric machine MGF, for example, with the torque of the first power source PU1 transmitted from the TF input gear 38*d* through the switching clutch CD1 to the ring gear R of the differential mechanism 40 being held by the sun gear S to which the reaction torque of the TF rotary electric machine MGF is applied, and with the differential mechanism 40 being placed in a state corresponding to the high gear position. In the "FIRST POWER SOURCE TORQUE SPLIT" mode established in the transfer 26, the TF rotary electric machine MGF performs a power driving. The "FIRST POWER SOURCE TORQUE SPLIT" mode is a hybrid driving mode, i.e., an HEV driving mode for enabling an engine running, i.e., a hybrid running (=HEV running) of the vehicle 8 using, for example, at least the first power source PU1 (particularly, the engine 12) as the power source. That is, in the "FIRST POWER SOURCE TORQUE SPLIT" mode, by controlling the torque of the TF rotating machine MGF in the HEV driving mode, the AWD running with the torque distribution ratio Rx being desirably changeable is enabled.

"FIRST POWER SOURCE LSD" mode of number m6 is established with the TF clutch CF1 being subject to the slip control, with the TF brake BF1 being placed in the released state, and with the switching clutch CD1 being placed in the engaged state. The "FIRST POWER SOURCE LSD" mode is also the HEV driving mode. The "FIRST POWER SOURCE LSD" mode is a mode for distributing the torque between the pair of front wheels 14 and the pair of rear wheels 16 at a desired ratio that is dependent on the torque capacity of the TF clutch CF1, for example, with the differential effect of the differential mechanism 40 being limited by the slip state of the TF clutch CF1, and with the differential mechanism 40 being placed in a state corresponding to the high gear position. That is, in the "FIRST POWER SOURCE LSD" mode, by adjusting the torque capacity of the TF clutch CF1 in the HEV driving mode, the AWD running with the torque distribution ratio Rx being desirably changeable is enabled. In the "FIRST POWER SOURCE LSD" mode, the power of the TF rotating machine MGF can be added to the driving torque Tr.

"FIRST POWER SOURCE Lock" mode of number m7 is established with the TF clutch CF1 being placed in the engaged state, with the TF brake BF1 being placed in the released state, and with switching clutch CD1 being placed in the engaged state. The "FIRST POWER SOURCE Lock" mode is also the HEV driving mode. The "FIRST POWER SOURCE Lock" mode is a mode for distributing the torque of the first power source PU1 between the pair of front wheels 14 and the pair of rear wheels 16 at a fixed ratio, with the differential mechanism 40 being placed in the differential lock state. That is, in the "FIRST POWER SOURCE Lock" mode, the AWD running with the torque distribution ratio Rx being fixed to 50 [%], for example, is enabled in the HEV driving mode. In the "FIRST POWER SOURCE Lock" mode, the power of the TF rotating machine MGF can be added to the driving torque Tr.

"FIRST POWER SOURCE TWO-WHEEL DRIVING (FR)" mode of number m8 is established with all of the TF clutch CF1, TF brake BF1 and switching clutch CD1 being placed in the released states. The "FIRST POWER SOURCE TWO-WHEEL DRIVING (FR)" mode is also the HEV driving mode. The "FIRST POWER SOURCE TWO-WHEEL DRIVING (FR)" mode is a mode for a rear-wheels drive running of the vehicle 8 with only the power of the first power source PU1.

For example, by operating the first power source PU1 in the operation state of each engagement device in the transfer 26, which is equivalent to each of the "BEV (FF) HIGH" mode, "BEV (FF) LOW" mode and "BEV_LSD" mode, and by placing the automatic transmission 24 in its power transmission state, it is possible to establish another mode that enables the AWD running in the HEV driving mode.

Referring back to FIG. 1, the hydraulic control unit 56 receives a working fluid OIL that is supplied from, for example, a mechanical fluid pump (not shown) driven by the first power source PU1 or an electric fluid pump (not shown) driven by a dedicated motor, wherein the mechanical fluid pump and the electric fluid pump are provided in the driving apparatus 10. The hydraulic control unit 56 regulates the received working fluid OIL, and outputs the regulated working fluid OIL as the CF1 pressure PRcf1, BF1 pressure PRbf1 and CD1 pressure PRcd1, for example.

The driving apparatus 10 is provided with the electronic control device 90 as a controller including a control device that is configured to control the power sources (engine 12, TM rotating machine MGM, TF rotating machine MGF) and the transfer 26, for example. The electronic control device 90 includes a so-called microcomputer incorporating a CPU, a ROM, a RAM and an input-output interface. The CPU performs various control operations of the driving apparatus 10, by processing various input signals, according to control programs stored in the ROM, while utilizing a temporary data storage function of the RAM.

The electronic control device 90 receives various input signals based on values detected by respective sensors provided in the driving apparatus 10. Specifically, the electronic control device 90 receives: an output signal of an engine speed sensor 60 indicative of an engine rotational speed Ne that is a rotational speed of the engine 12; an output signal of an MGM speed sensor 62 indicative of an MGM rotational speed Nmgm that is a rotational speed of the TM rotary electric machine MGM, an output signal of a vehicle speed sensor 64 indicative of a TF output rotational speed Nof which is a rotational speed of the TF output gear 26a and which corresponds to the vehicle running speed V; an output signal of an MGF speed sensor 66 indicative of an MGF rotational speed Nmgf that is a rotational speed of the TF rotary electric machine MGF; an output signal of an accelerator-opening degree sensor 68 indicative of an accelerator opening degree θacc representing an amount of accelerating operation made by the vehicle driver; an output signal of a throttle-opening degree sensor 70 indicative of a throttle opening degree θth which is an opening degree of an electronic throttle valve; an output signal of a brake pedal sensor 72 which is a brake-ON signal Bon representing a state in which a brake pedal is being operated by the vehicle driver; an output signal of a shift position sensor 74 indicative of a shift operation position POSsh that is an operation position of a shift lever provided in the vehicle 8; an output signal of a yaw rate sensor 76 indicative of a yaw rate Ryaw that is a rotational angular speed of the vehicle 8 about its vertical axis; an output signal of a steering sensor 78 indicative of a steering angle θsw and a steering direction Dsw of a steering wheel provided in the vehicle 8; an output signal of a fluid temperature sensor 80 indicative of a working-fluid temperature THoil that is a temperature of a working fluid in the hydraulic control unit 56; and an output signal of a differential-lock selection switch 82 which is a lock-mode ON signal LOCKon.

The differential-lock selection switch 82 is provided in vicinity of a driver seat of the vehicle 8. The differential-lock selection switch 82 is a switch that is to be placed in its ON state by the vehicle driver when the differential mechanism 40 is to be placed in the differential lock state in the transfer 28.

The electronic control device 90 generates various output signals to the various devices provided in the vehicle 8, such as: an engine control command signal Se that is to be supplied to the engine control device 50 for controlling the engine 12; an MGM control command signal Smgm that is to be supplied to the inverter 52 for controlling the TM rotary electric machine MGM; an MGF control command signal Smgf that is to be supplied to the inverter 52 for controlling the TF rotary electric machine MGF; a hydraulic command signal Sat that is to be supplied to the hydraulic control unit 56 for controlling the operation state of each of the engagement devices so as to control the automatic transmission 24; a hydraulic command signal Scbf that is to be supplied to the hydraulic control unit 56 for controlling the operation state of each of the TF clutch CF1 and the TF brake BF1 so as to control the transfer 26; a brake control command signal Sb that is to be supplied to a wheel brake device 84 for controlling a braking force generated by each wheel brake; and an information-notification control command signal Sinf that is to be supplied to an information notification device 86 for notifying various information to the vehicle driver.

Although the automatic transmission 24 is a step-variable transmission in the driving apparatus 10, it is possible to define a continuously-variable transmission as a whole by utilizing an electric path from the TM rotating machine MGM to the TF rotating machine MGF. The electrical path is one of power transmission paths of an engine power Pe, and the power is to be electrically transmitted along the electrical path through a power transfer between the TM rotating machine MGM and the TF rotating machine MGF. As the power transmission paths of an engine power Pe, there is a mechanical path in addition to the electrical path, wherein the mechanical path is a path along which the power is to be mechanically transmitted through the torque converter 22 and the automatic transmission 24.

The electronic control device 90 can shift or change an engine operation point to a fuel-economy optimum point lying on a fuel-economy optimum line without changing a requested engine power Pedem, for example, by using a part of the engine power Pe to cause the TM rotary electric machine MGM to perform a power generation. The electric power generated by the TM rotating machine MGM is supplied to the TF rotating machine MGF through the above-described electrical path, and is converted into a mechanical power by the TF rotating machine MGF. The engine operation point is an operation point of the engine 12 that is defined by a combination of the engine rotational speed Ne and the engine torque Te. The fuel-economy optimum line consists of a succession of predetermined fuel-economy optimum points each of which is an optimum engine operation point for improving the fuel economy of the engine 12.

The electronic control device 90 determines which one of the modes (see FIG. 4) is to be established in the transfer 26, for example, based on a running state of the vehicle 8 such as the running speed V, the accelerator opening degree θacc, the yaw rate Ryaw, the steering angle θsw, the steering direction Dsw, the lock-mode ON signal LOCKon and a wheel slip rate of each of the front and rear wheels, and then outputs various control command signals for establishing the determined one of the modes, wherein the various control command signals include the pressure control command signal Scbf for each of the TF clutch CF1, TF brake BF1 and switching clutch CD1.

In the "BEV_LSD" mode, "FIRST POWER SOURCE TORQUE SPLIT" mode, and "FIRST POWER SOURCE LSD" mode, for example, the electronic control device 90 determines the running state of the vehicle 8, based on the running speed V, accelerator opening degree θacc, yaw rate Ryaw, steering angle θsw and steering direction Dsw, and determines a target value of the torque distribution ratio Rx, depending on the determined running state.

In the driving apparatus 10, the transfer 26 is disposed laterally, namely, the transfer 26 is disposed to be coaxial with the pair of front drive shafts 30 that extend in a width direction of the vehicle 8 perpendicular to a longitudinal direction of the vehicle 8 (see FIG. 2). That is, a rotary axis of the transfer 26 is coaxial with the pair of the front drive shafts 30. Thus, the driving apparatus 10 in which the transfer 26 is disposed laterally is made compact in size.

Referring to FIG. 2, in the power transmission device 18, the third rotary element RE3 (ring gear R) and the rear propeller shaft 32 are both connected to the TF input gear 38d on a side of one of the right and left front wheels 14 relative to the transfer 26 in the vehicle width direction, i.e., an axial direction of the transfer 26, namely, the third rotary element RE3 and the rear propeller shaft 32 are both connected to the TF input gear 38d in an area that is located between the transfer 26 and one of the right and left front wheels 14 in the vehicle width direction, i.e., the axial direction of the transfer 26. That is, in the driving apparatus 10, the TF transmission member 26b connected to the ring gear R of the differential mechanism 40 is connected to the TF input gear 38d, and the TF output gear 26a connected to the rear propeller shaft 32 is connected to the TF input gear 38d, on the side of one of the right and left front wheels 14 relative to the transfer 26 in the vehicle width direction. In the present embodiment, the above-described one of the right and left front wheels 14 is the left front wheel 14 (see FIG. 2). It is noted that, in FIG. 2, the TF input gear 38d is represented by thick lines, for indicating the TF input gear 38d clearly.

In the power transmission device 18, the pair of bevel gears (26a, 32a) configured to transmit the power from the TF input gear 38d to the rear propeller shaft 32 is disposed on the TF input gear 38d. In the power transmission device 18, the TF input gear 38d, the transfer 26 and the front differential device 28 are disposed sequentially in the axial direction of the transfer 26 that is parallel to the pair of front drive shafts 30.

As described above, in the present embodiment, the third rotary element RE3 and the rear propeller shaft 32 are both connected to the TF input gear 38d in the area located between the transfer 26 and one of the right and left wheels in the axial direction of the transfer 26, wherein the TF input gear 38d is disposed to be coaxial with the pair of front drive shafts 30. This arrangement enables the driving apparatus 10 to be made compact in size, wherein the transfer 26 is disposed laterally.

Further, in the present embodiment, the switching clutch CD1 is provided to selectively connect between the third rotary element RE3 and the rear propeller shaft 32, and between the third rotary element RE3 and the TF input gear 38d. Therefore, it is possible to switch between the AWD and the 2WD, and to simplify the construction for cutting off the power transmission from the first power source PU1 to the transfer 26 and to the front differential device 28.

There will be described other embodiments of this invention. The same reference signs as used in the above-described first embodiment will be used in the following embodiment, to identify the functionally corresponding elements, and descriptions thereof are not provided.

Second Embodiment

Figure 5:
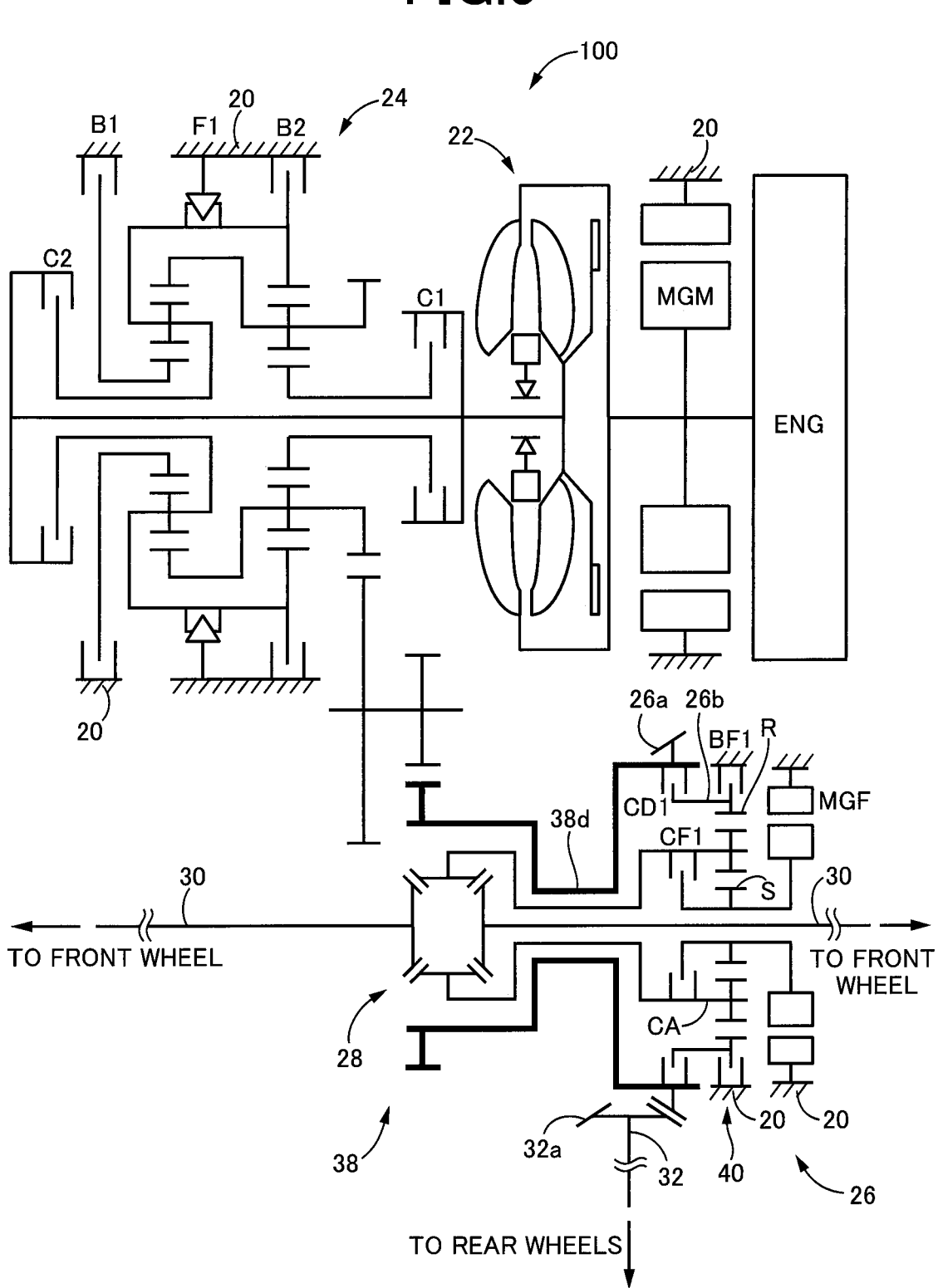
FIG. 5 is a view schematically showing a construction of a power transmission device according to a second embodiment of the present invention.

FIG. 5 is a view schematically showing a construction of a power transmission device 100 according to a second embodiment of the present invention. The power transmission device 100 is mainly different from the power transmission device 18 in the above-described first embodiment, in terms of a position of the front differential device 28. However, the power transmission device 100 is substantially the same as the power transmission device 18 in terms of connection relationship between members, the collinear chart relating to the transfer 26 shown in FIG. 3 and the table relating to the transfer 26 shown in FIG. 4.

In the power transmission device 100, the TF input gear 38d, the front differential device 28 and the transfer 26 are disposed sequentially in the axial direction of the transfer 26 that is parallel to the pair of front drive shafts 30. The TF input gear 38d and the front differential device 28 are disposed in respective positions overlapping with each other in a radial direction of the pair of front drive shafts 30, i.e., in a direction perpendicular to the axial direction of the pair of front drive shafts 30. In other words, the TF input gear 38*d* and the front differential device 28 are arranged such that their axial positions parallel to the pair of front drive shafts 30 overlap with each other. It is noted that, in FIG. 5, the TF input gear 38*d* is represented by thick lines, for indicating the TF input gear 38*d* clearly.

As described above, as in the above-described first embodiment, in the present second embodiment, the driving apparatus 10 in which the transfer 26 is disposed laterally can be made compact in size. Further, it is possible to switch between the AWD and the 2WD, and to simplify the construction for cutting off the power transmission from the first power source PU1 to the transfer 26 and to the front differential device 28.

Third Embodiment

Figure 6:
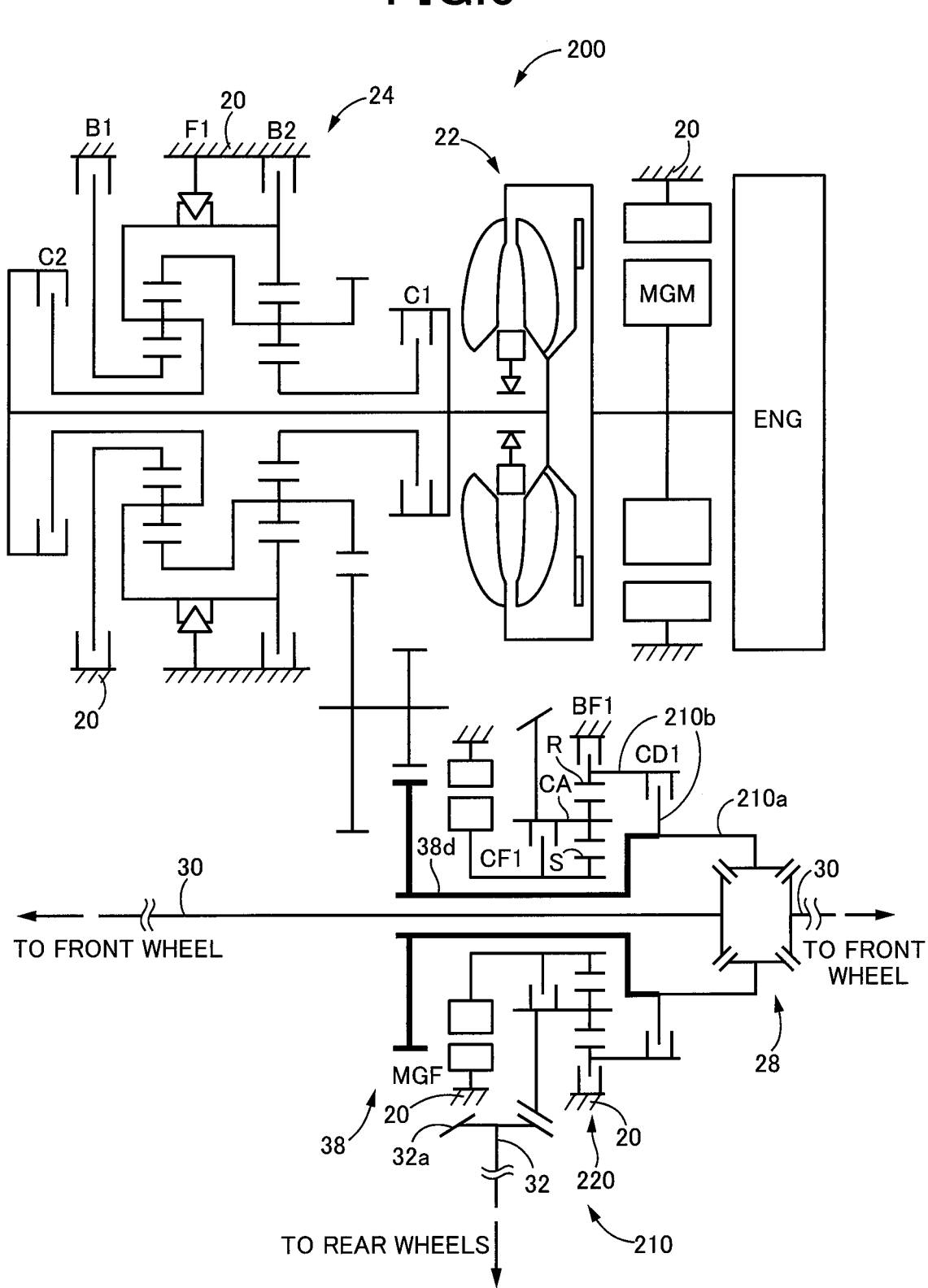
FIG. 6 is a view schematically showing a construction of a power transmission device according to a third embodiment of the present invention.

FIG. 6 is a view schematically showing a construction of a power transmission device 200 according to a third embodiment of the present invention. The power transmission device 200 is mainly different from the power transmission device 18 in the above-described first embodiment, in that a transfer 210 is provided in place of the transfer 26.

The transfer 210 serves as a power distribution device configured to distribute the power of the first power source PU1, between the pair of front wheels 14 and the pair of rear wheels 16. The transfer 210 includes a TF rotating machine MGF, a differential mechanism 220, a TF clutch CF1, a TF brake BF1, a switching clutch CD1, a TF output member 210*a* and a TF transmission member 210*b* that are disposed on a common rotation axis that is coaxial with the pair of front drive shafts 30. That is, the transfer 210 is disposed to be coaxial with the pair of front drive shafts 30.

The TF output member 210*a* is connected to the TF input gear 38*d*. The TF transmission member 210*b* is connected at its one side portion with the differential mechanism 220, and is connected at its another side portion with the TF input gear 38*d* and the TF output member 210*a*. The one side portion and the other side portion of the TF transmission member 210*b* are connected to each other through the switching clutch CD1 in a power transmittable manner. The TF output member 210*a* is connected to the front differential device 28. Thus, the power of the first power source PU1 is transmitted from the TF input gear 38*d* to the front differential device 28 through the TF output member 210*a*.

The differential device 220 is constituted by a single-pinion-type planetary gear device, and includes a sun gear S, a carrier CA and a ring gear R. The TF rotating machine MGF is connected to the sun gear S in a power transmittable manner. The carrier CA is connected to the rear propeller shaft 32 through a pair of bevel gears. The ring gear R is selectively connected to the casing 20 through the TF brake BF1. Further, the TF transmission member 210*b* is connected to the ring gear R, such that the ring gear R is selectively connected to the TF input gear 38*d* and the TF output gear 210*a* through the switching clutch CD1. That is, the ring gear R is selectively connected to the front differential device 28 through the switching clutch CD1. In the transfer 210, with the switching clutch CD1 being placed in the engaged state or slip state, a part of the power from the TF input gear 38*d* is inputted to the ring gear R of the differential mechanism 220, for example.

Figure 7:
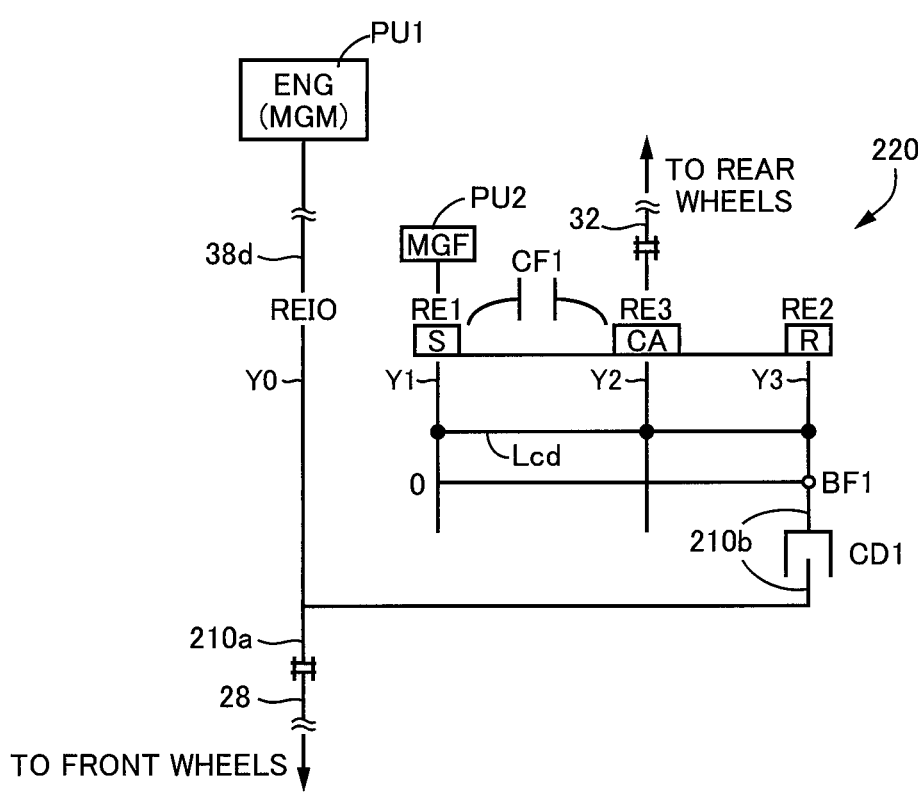
FIG. 7 is a collinear chart indicating a relationship among rotational speeds of rotary elements of a transfer shown in FIG. 6.

FIG. 7 is a collinear chart indicating a relationship among rotational speeds of rotary elements of the transfer 210. In FIG. 7, three vertical lines Y1, Y2, Y3 corresponding to the three rotary elements of the differential mechanism 220 constituting the transfer 210 are an axis representative of a rotational speed of the sun gear S corresponding to a first rotary element RE1, an axis representative of a rotational speed of the carrier CA corresponding to a third rotary element RE3, and an axis representative of a rotational speed of the ring gear R corresponding to a second rotary element RE2, in order from the left side. Further, in FIG. 7, a vertical line Y0, which is located on a left side of the vertical line Y1, is an axis representative of a rotational speed of the TF input gear 38*d* and the TF output member 210*a* corresponding to an input/output rotary element REIO.

As shown in the collinear chart of FIG. 7, in the transfer 210, the input/output rotary element REIO is selectively connected to the ring gear R through the switching clutch CD1, and is connected to the front differential device 28. Further, the input/output rotary element REIO is connected to the first power source PU1 through the torque converter 22 and the automatic transmission 24 in a power transmittable manner.

In the differential mechanism 220, the TF rotating machine MGF is connected to the first rotary element RE1 in a power transmittable manner. The rear propeller shaft 32 is connected to the third rotary element RE3. The second rotary element RE2 is selectively connected to the TF output member 210*a*, i.e., the front differential device 28, through the switching clutch CD1, and is selectively connected to the casing 20 through the TF brake BF1. The second rotary element RE2 is further selectively connected to the TF input gear 38*d* through the switching clutch CD1. In the power transmission device 200, the TF input gear 38*d* is a power transmission member configured to the power of the first power source PU1 to the second rotary element RE2. In the power transmission device 200, the switching clutch CD1 is an engagement device configured to selectively connect between the second rotary element RE2 and the front differential device 28, and between the second rotary element RE2 and the TF input gear 38*d*. The first rotary element RE1 and the third rotary element RE3 are selectively connected to each other through the TF clutch CF1.

In the differential mechanism 220, the first, second and third rotary elements RE1, RE2 and RE3 are integrally rotated, with the TF clutch CF1 being in the engaged state and with the TF brake BF1 being in the released state. On the other hand, in the differential mechanism 220, a rotational speed of the third rotary element RE3 is reduced relative to a rotational speed of the first rotary element RE1, with the TF clutch CF1 being in the released state and with the TF brake BF1 being in the engaged state.

Further, the differential mechanism 220 serves as a central differential device. In this instance, with the switching clutch CD1 being placed in the engaged state or slip state, the differential mechanism 220 is capable of distributing the torque inputted to the second rotary element RE2 from the first power source PU1, to the third rotary element RE3, owing to a reaction torque of the TF rotating machine MGF. Further, the differential mechanism 220 is capable of distributing the torque inputted to the second rotary element RE2 from the first power source PU1, to the third rotary element RE3, by limiting the differential effect of the differential mechanism 220, by placing the TF clutch CF1 in the slip state or engaged state in place of applying the reaction torque of the TF rotating machine MGF. Thus, the transfer 210 serves as a torque distribution device configured to distribute a part of the torque transmitted to the TF input gear 38*d* from the first power source PU1, to the rear propeller shaft 32. Thus, in the transfer 210, the torque can be distributed between the pair of front wheels 14 and the pair of rear wheels 16.

FIG. 8 is a table indicating a relationship between each mode established in the transfer 210 and the operation states of the respective engagement devices in the transfer 210. In the table of FIG. 8, the relationship between each of "BEV (FR) HIGH" mode of number m1 through "FIRST POWER SOURCE TWO-WHEEL DRIVING (FF)" mode of number m8 and the operation states of the respective engagement devices is substantially the same as the relationship between each of the "BEV (FF) HIGH" mode of number m1 through "FIRST POWER SOURCE TWO-WHEEL DRIVING (FR)" mode of number m8 and the operation states of the respective engagement devices in FIG. 4. Therefore, regarding FIG. 8, main differences from FIG. 4 will be described, and detailed descriptions will not be provided.

In the power transmission device 200, when the operation of the first power source PU1 is stopped, the power of the TF rotating machine MGF is transmittable through the transfer 210 to at least the rear propeller shaft 32, i.e., the rear wheels 16, so that the BEV running is performed by the rear-wheels drive running. Further, in the power transmission device 200, the power of the first power source PU1 can be transmitted to the front differential device 28, i.e., the front wheels 14 without through the transfer 210, and can be distributed to the rear propeller shaft 32 through the transfer 210. Thus, in the HEV driving mode, the front-wheels drive running can be performed by only the power of the first power source PU1, and the AWD running can be performed with a part of the torque, which is transmitted to the front wheels 14, being distributed to the rear wheels 16. Therefore, as compared with in the table of FIG. 4, in the table of FIG. 8, the "BEV (FF) HIGH" mode of number m1 and the "BEV (FF) LOW" mode of number m2 are changed to the "BEV (FR) HIGH" mode of number m1 and the "BEV (FR) LOW" mode of number m2, respectively, and the "FIRST POWER SOURCE TWO-WHEEL DRIVING (FR)" mode of number m8 is changed to the "FIRST POWER SOURCE TWO-WHEEL DRIVING (FF)" mode of number m8.

Like the above-described transfer 26, the transfer 210 is disposed laterally. The driving apparatus 10 in which the transfer 210 is disposed laterally is made compact in size, as in the driving apparatus 10 according to the above-described first and second embodiments.

Referring to FIG. 6, in the power transmission device 200, the second rotary element RE2 (ring gear R) and the front differential device 28 are both connected to the TF input gear 38d on a side of one of the right and left front wheels 14 relative to the transfer 210 in the vehicle width direction, i.e., an axial direction of the transfer 210, namely, the second rotary element RE2 and the front differential device 28 are both connected to the TF input gear 38d in an area that is located between the transfer 210 and one of the right and left front wheels 14 in the vehicle width direction, i.e., the axial direction of the transfer 210. That is, in the driving apparatus 10 according to the present third embodiment, the TF transmission member 210b connected to the ring gear R of the differential mechanism 210 is connected to the TF input gear 38d, and the TF output member 210a connected to the front differential device 28 is connected to the TF input gear 38d, on the side of one of the right and left front wheels 14 relative to the transfer 210 in the vehicle width direction. In the present third embodiment, the above-described one of the right and left front wheels 14 is the right front wheel 14 (see FIG. 6). It is noted that, in FIG. 6, the TF input gear 38d is represented by thick lines, for indicating the TF input gear 38d clearly.

In the power transmission device 200, the TF input gear 38d, the transfer 210 and the front differential device 28 are disposed sequentially in the axial direction of the transfer 210 that is parallel to the pair of front drive shafts 30. The TF input gear 38d and the transfer 210 are disposed in respective positions overlapping with each other in a radial direction of the pair of front drive shafts 30, i.e., in a direction perpendicular to the axial direction of the pair of front drive shafts 30. In other words, the TF input gear 38d and the transfer 210 are arranged such that their axial positions parallel to the pair of front drive shafts 30 overlap with each other.

As described above, in the present third embodiment, the second rotary element RE2 and the front differential device 28 are both connected to the TF input gear 38d in the area located between the transfer 210 and one of the right and left wheels in the axial direction of the transfer 210, wherein the TF input gear 38d is disposed to be coaxial with the pair of front drive shafts 30. This arrangement enables the driving apparatus 10 to be made compact in size, wherein the transfer 210 is disposed laterally.

Further, in the present third embodiment, the switching clutch CD1 is provided to selectively connect between the second rotary element RE2 and the TF input gear 38d, and between the second rotary element RE2 and the TF input gear 38d. Therefore, it is possible to switch between the AWD and the 2WD, and to simplify the construction for cutting off the power transmission from the first power source PU1 to the transfer 210 and to the rear propeller shaft 32.

Fourth Embodiment

Figure 9:
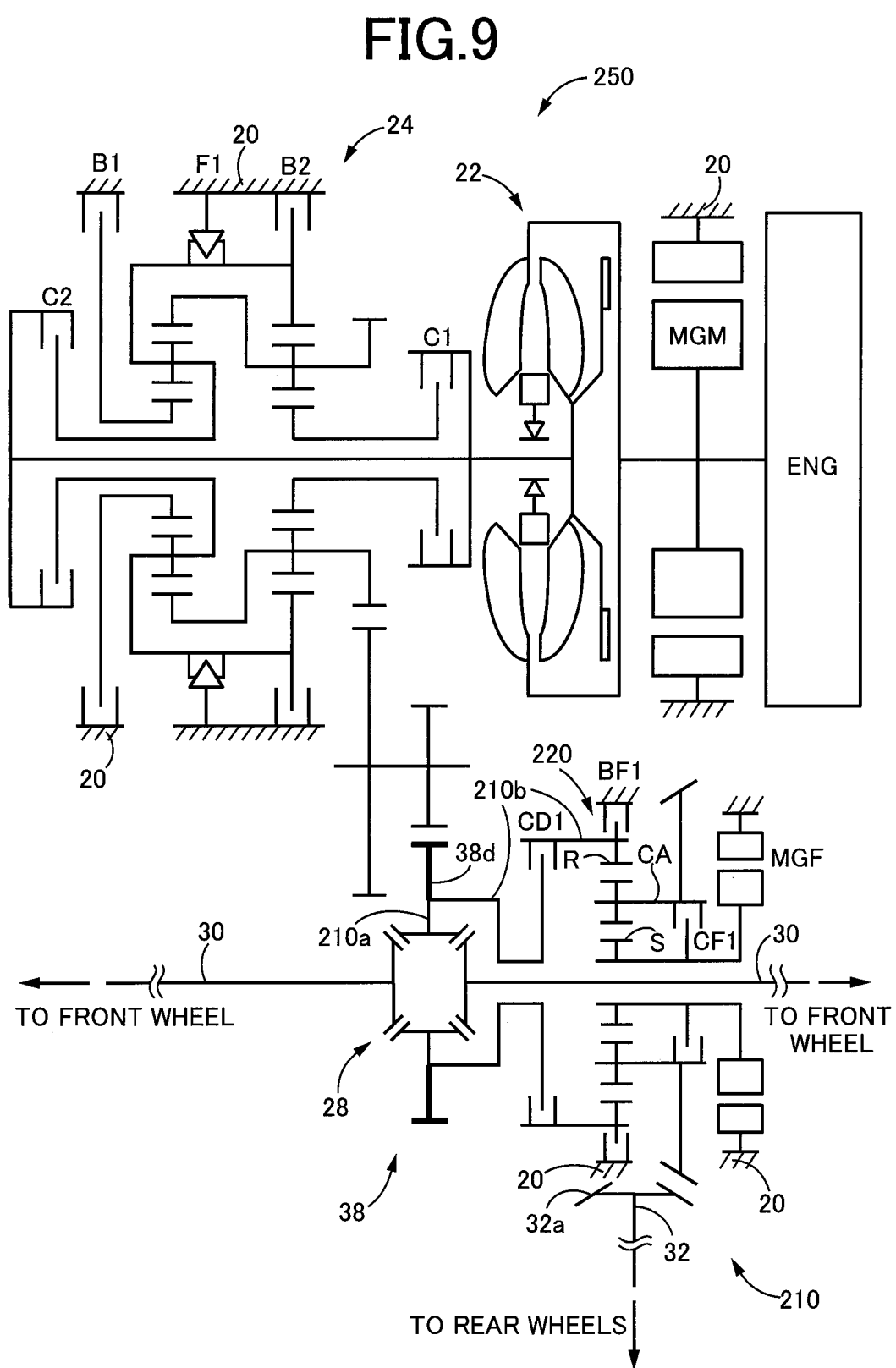
FIG. 9 is a view schematically showing a construction of a power transmission device according to a fourth embodiment of the present invention.

FIG. 9 is a view schematically showing a construction of a power transmission device 250 according to a fourth embodiment of the present invention. The power transmission device 250 is mainly different from the power transmission device 200 of FIG. 6 in the above-described third embodiment, in terms of a position of the front differential device 28. However, the power transmission device 250 is substantially the same as the power transmission device 200 in terms of connection relationship between members, the collinear chart relating to the transfer 210 shown in FIG. 7 and the table relating to the transfer 210 shown in FIG. 8.

In the power transmission device 250, positions of the transfer 210 and the front differential device 28 are substantially symmetrical with those in the power transmission device 200 in the width direction of the vehicle 8. That is, in the power transmission device 250, the TF input gear 38d, the front differential device 28 and the transfer 210 are disposed sequentially in the axial direction of the transfer 210 that is parallel to the pair of front drive shafts 30. The TF input gear 38d and the front differential device 28 are disposed in respective positions overlapping with each other in a radial direction of the pair of front drive shafts 30, i.e., in a direction perpendicular to the axial direction of the pair of front drive shafts 30. In other words, the TF input gear 38d and the front differential device 28 are arranged such that their axial positions parallel to the pair of front drive shafts 30 overlap with each other. It is noted that, in FIG. 9, the TF input gear 38d is represented by thick lines, for indicating the TF input gear 38d clearly.

As described above, as in the above-described third embodiment, in the present fourth embodiment, the driving apparatus 10 in which the transfer 210 is disposed laterally can be made compact in size. Further, it is possible to switch between the AWD and the 2WD, and to simplify the construction for cutting off the power transmission from the first power source PU1 to the transfer 210 and to the rear propeller shaft 32.

Fifth Embodiment

Figure 10:
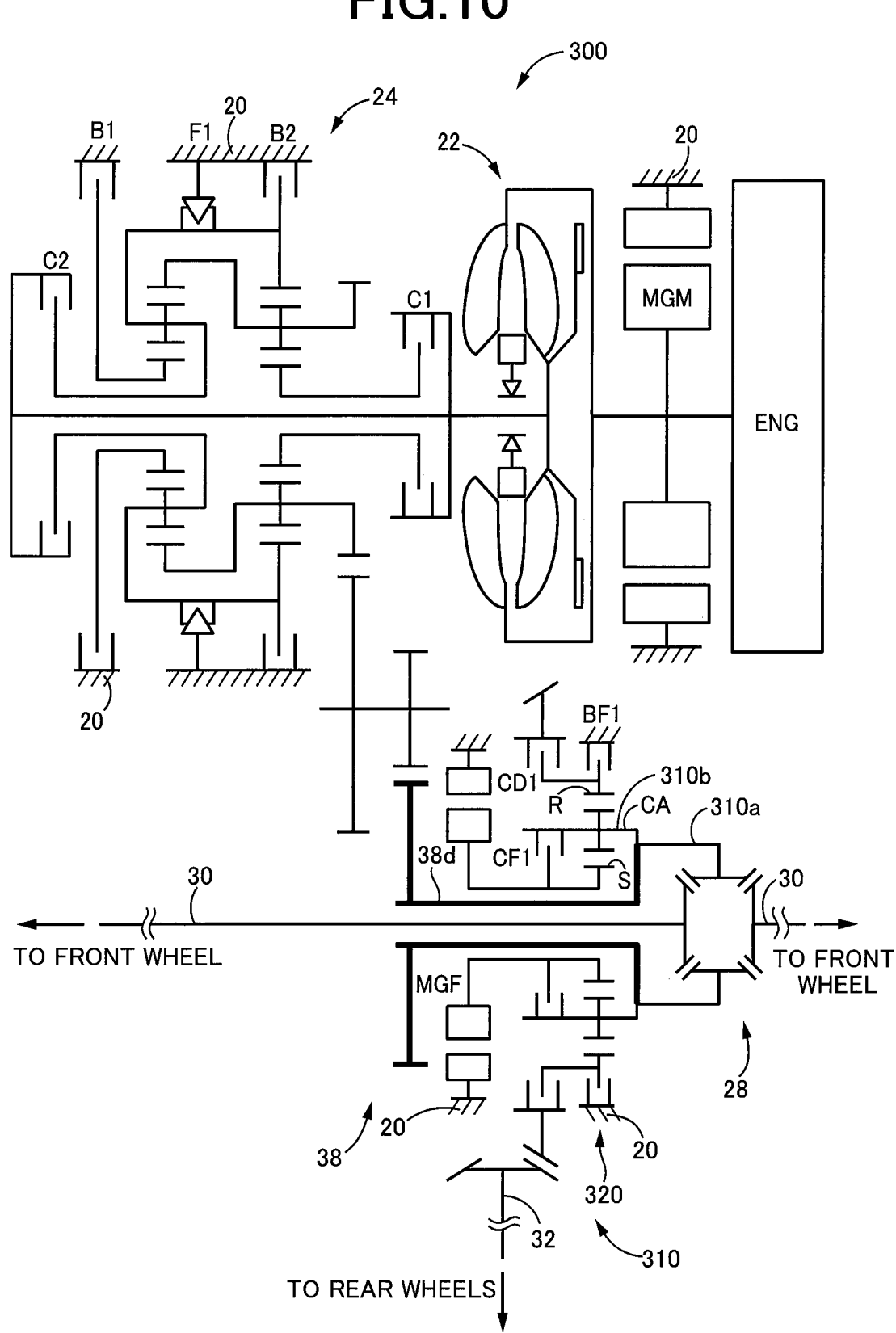
FIG. 10 is a view schematically showing a construction of a power transmission device according to a fifth embodiment of the present invention.

FIG. 10 is a view schematically showing a construction of a power transmission device 300 according to a fifth embodiment of the present invention. The power transmission device 300 is mainly different from the power transmission device 200 of FIG. 6 in the above-described third embodiment, in that a transfer 310 is provided in place of the transfer 210.

The transfer 310 serves as a power distribution device configured to distribute the power of the first power source PU1, between the pair of front wheels 14 and the pair of rear wheels 16. The transfer 310 includes a TF rotating machine MGF, a differential mechanism 320, a TF clutch CF1, a TF brake BF1, a switching clutch CD1, a TF output member 310a and a TF transmission member 310b that are disposed on a common rotation axis that is coaxial with the pair of front drive shafts 30. That is, the transfer 310 is disposed to be coaxial with the pair of front drive shafts 30.

The TF output member 310a is connected to the TF input gear 38d. The TF transmission member 310b is connected at its one side portion with the differential mechanism 320, and is connected at its another side portion with the TF input gear 38d and the TF output member 310a. The TF output member 310a is connected to the front differential device 28. Thus, the power of the first power source PU1 is transmitted from the TF input gear 38d to the front differential device 28 through the TF output member 310a.

The differential device 320 is constituted by a single-pinion-type planetary gear device, and includes a sun gear S, a carrier CA and a ring gear R. The TF rotating machine MGF is connected to the sun gear S in a power transmittable manner. The carrier CA, to which the TF transmission member 310b is connected, is connected to the TF input gear 38d and the TF output member 310a. That is, the carrier CA is connected to the front differential device 28. The ring gear R is selectively connected to the casing 20 through the TF brake BF1. Further, the ring gear R is connected to the rear propeller shaft 32 through the switching clutch CD1 and a pair of bevel gears. That is, the ring gear R is selectively connected to the rear propeller shaft 32 through the switching clutch CD1. In the transfer 310, with the switching clutch CD1 being placed in the engaged state or slip state, the power is transmitted from the transfer 310 to the rear propeller shaft 32.

Figure 11:
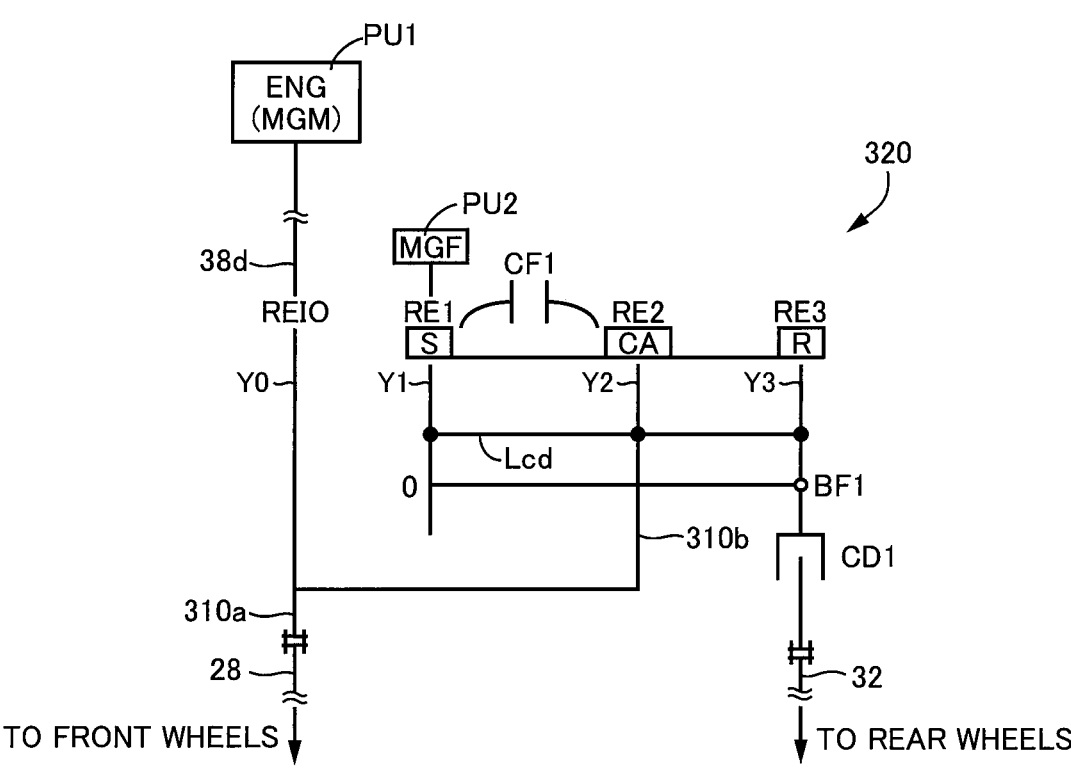
FIG. 11 is a collinear chart indicating a relationship among rotational speeds of rotary elements of a transfer shown in FIG. 10.

FIG. 11 is a collinear chart indicating a relationship among rotational speeds of rotary elements of the transfer 310. In FIG. 11, three vertical lines Y1, Y2, Y3 corresponding to the three rotary elements of the differential mechanism 320 constituting the transfer 310 are an axis representative of a rotational speed of the sun gear S corresponding to a first rotary element RE1, an axis representative of a rotational speed of the carrier CA corresponding to a second rotary element RE2, and an axis representative of a rotational speed of the ring gear R corresponding to a third rotary element RE3, in order from the left side. Further, in FIG. 11, a vertical line Y0, which is located on a left side of the vertical line Y1, is an axis representative of a rotational speed of the TF input gear 38d and the TF output member 310a corresponding to an input/output rotary element REIO.

As shown in the collinear chart of FIG. 11, in the transfer 310, the input/output rotary element REIO is connected to the carrier CA, and is connected to the front differential device 28. Further, the input/output rotary element REIO is connected to the first power source PU1 through the torque converter 22 and the automatic transmission 24 in a power transmittable manner.

In the differential mechanism 320, the TF rotating machine MGF is connected to the first rotary element RE1 in a power transmittable manner. The rear propeller shaft 32 is connected to the third rotary element RE3. The second rotary element RE2 is connected to the TF output member 310a, i.e., the front differential device 28. The third rotary element RE3 is selectively connected to the rear propeller shaft 32 through the switching clutch CD1, and is selectively connected to the casing 20 through the TF brake BF1. In the power transmission device 300, the TF input gear 38d is a power transmission member configured to the power of the first power source PU1 to the second rotary element RE2. In the power transmission device 300, the switching clutch CD1 is an engagement device configured to selectively connect between the third rotary element RE3 and the rear propeller shaft 32. The first rotary element RE1 and the second rotary element RE2 are selectively connected to each other through the TF clutch CF1.

In the differential mechanism 320, the first, second and third rotary elements RE1, RE2 and RE3 are integrally rotated, with the TF clutch CF1 being in the engaged state and with the TF brake BF1 being in the released state. On the other hand, in the differential mechanism 320, a rotational speed of the second rotary element RE2 is reduced relative to a rotational speed of the first rotary element RE1, with the TF clutch CF1 being in the released state and with the TF brake BF1 being in the engaged state.

Further, the differential mechanism 320 serves as a central differential device. In this instance, the differential mechanism 320 is capable of distributing the torque inputted to the second rotary element RE2 from the first power source PU1, to the third rotary element RE3, owing to a reaction torque of the TF rotating machine MGF. Further, the differential mechanism 320 is capable of distributing the torque inputted to the second rotary element RE2 from the first power source PU1, to the third rotary element RE3, by limiting the differential effect of the differential mechanism 320, by placing the TF clutch CF1 in the slip state or engaged state in place of applying the reaction torque of the TF rotating machine MGF. Thus, the transfer 310 serves as a torque distribution device configured to distribute a part of the torque transmitted to the TF input gear 38d from the first power source PU1, to the rear propeller shaft 32. Thus, in the transfer 310, the torque can be distributed between the pair of front wheels 14 and the pair of rear wheels 16.

FIG. 12 is a table indicating a relationship between each mode established in the transfer 310 and the operation states of the respective engagement devices in the transfer 310. In the table of FIG. 12, the relationship between each of "BEV (FF) HIGH" mode of number m1 through "FIRST POWER SOURCE TWO-WHEEL DRIVING (FF)" mode of number m8 and the operation states of the respective engagement devices is substantially the same as the relationship between each of the "BEV (FR) HIGH" mode of number m1 through "FIRST POWER SOURCE TWO-WHEEL DRIVING (FF)" mode of number m8 and the operation states of the respective engagement devices in FIG. 8. Therefore, regarding FIG. 12, main differences from FIG. 8 will be described, and detailed descriptions will not be provided.

In the power transmission device 300, when the operation of the first power source PU1 is stopped, the power of the TF rotating machine MGF is transmittable through the transfer 310 to at least the front differential device 28, i.e., the front wheels 14, so that the BEV running is performed by the front-wheels drive running. Therefore, as compared with in the table of FIG. 8, in the table of FIG. 12, the "BEV (FR) HIGH" mode of number m1 and the "BEV (FR) LOW" mode of number m2 are changed to the "BEV (FF) HIGH" mode of number m1 and the "BEV (FF) LOW" mode of number m2, respectively.

Further, in the power transmission device 300, the TF rotating machine MGF is regeneratively operated, for example, when the torque of the first power source PU1 transmitted from the TF input gear 38d to the carrier CA of the differential mechanism 320 being held by the sun gear S to which the reaction torque of the TF rotary electric machine MGF is applied, with the differential mechanism 320 being placed in a state corresponding to the high gear position. Thus, in the "FIRST POWER SOURCE TORQUE SPLIT" mode of the number m5 shown in the table of FIG. 12, it is not possible to realize a running mode in which the power regenerated by the TM rotating machine MGM is supplied to the TF rotating machine MGF that performs the power driving, by using also the electrical path. The power regenerated by the TM rotating machine MGM is supplied to, for example, the battery 54, so as to charge the battery 54.

Like the above-described transfer 210, the transfer 310 is disposed laterally. The driving apparatus 10 in which the transfer 310 is disposed laterally is made compact in size, as in the driving apparatus 10 according to the above-described first through fourth embodiments.

As shown in FIG. 10, in the power transmission device 300, the second rotary element RE2 (carrier CA) and the front differential device 28 are both connected to the TF input gear 38d on a side of one of the right and left front wheels 14 relative to the transfer 310 (particularly, the differential mechanism 320) in the vehicle width direction, i.e., an axial direction of the transfer 310, namely, the second rotary element RE2 and the front differential device 28 are both connected to the TF input gear 38d in an area that is located between the transfer 310 and one of the right and left front wheels 14 in the vehicle width direction, i.e., the axial direction of the transfer 310. That is, in the driving apparatus 10 according to the present fifth embodiment, the TF transmission member 310b connected to the carrier CA of the differential mechanism 320 is connected to the TF input gear 38d, and the TF output member 310a connected to the front differential device 28 is connected to the TF input gear 38d, on the side of one of the right and left front wheels 14 relative to the transfer 310 in the vehicle width direction. In the present fifth embodiment, the above-described one of the right and left front wheels 14 is the right front wheel 14 (see FIG. 10). It is noted that, in FIG. 10, the TF input gear 38d is represented by thick lines, for indicating the TF input gear 38d clearly.

In the power transmission device 300, the TF input gear 38d, the transfer 310 and the front differential device 28 are disposed sequentially in the axial direction of the transfer 310 that is parallel to the pair of front drive shafts 30. The TF input gear 38d and the transfer 310 are disposed in respective positions overlapping with each other in a radial direction of the pair of front drive shafts 30, i.e., in a direction perpendicular to the axial direction of the pair of front drive shafts 30. In other words, the TF input gear 38d and the transfer 310 are arranged such that their axial positions parallel to the pair of front drive shafts 30 overlap with each other.

As described above, in the present fifth embodiment, the second rotary element RE2 and the front differential device 28 are both connected to the TF input gear 38d in the area located between the transfer 310 and one of the right and left wheels in the axial direction of the transfer 310, wherein the TF input gear 38d is disposed to be coaxial with the pair of front drive shafts 30. This arrangement enables the driving apparatus 10 to be made compact in size, wherein the transfer 310 is disposed laterally.

Further, in the present fifth embodiment, the switching clutch CD1 is provided to selectively connect between the third rotary element RE3 and the rear propeller shaft 32. Therefore, it is possible to switch between the AWD and the 2WD, and to simplify the construction for cutting off the power transmission to the rear propeller shaft 32.

Sixth Embodiment

Figure 13:
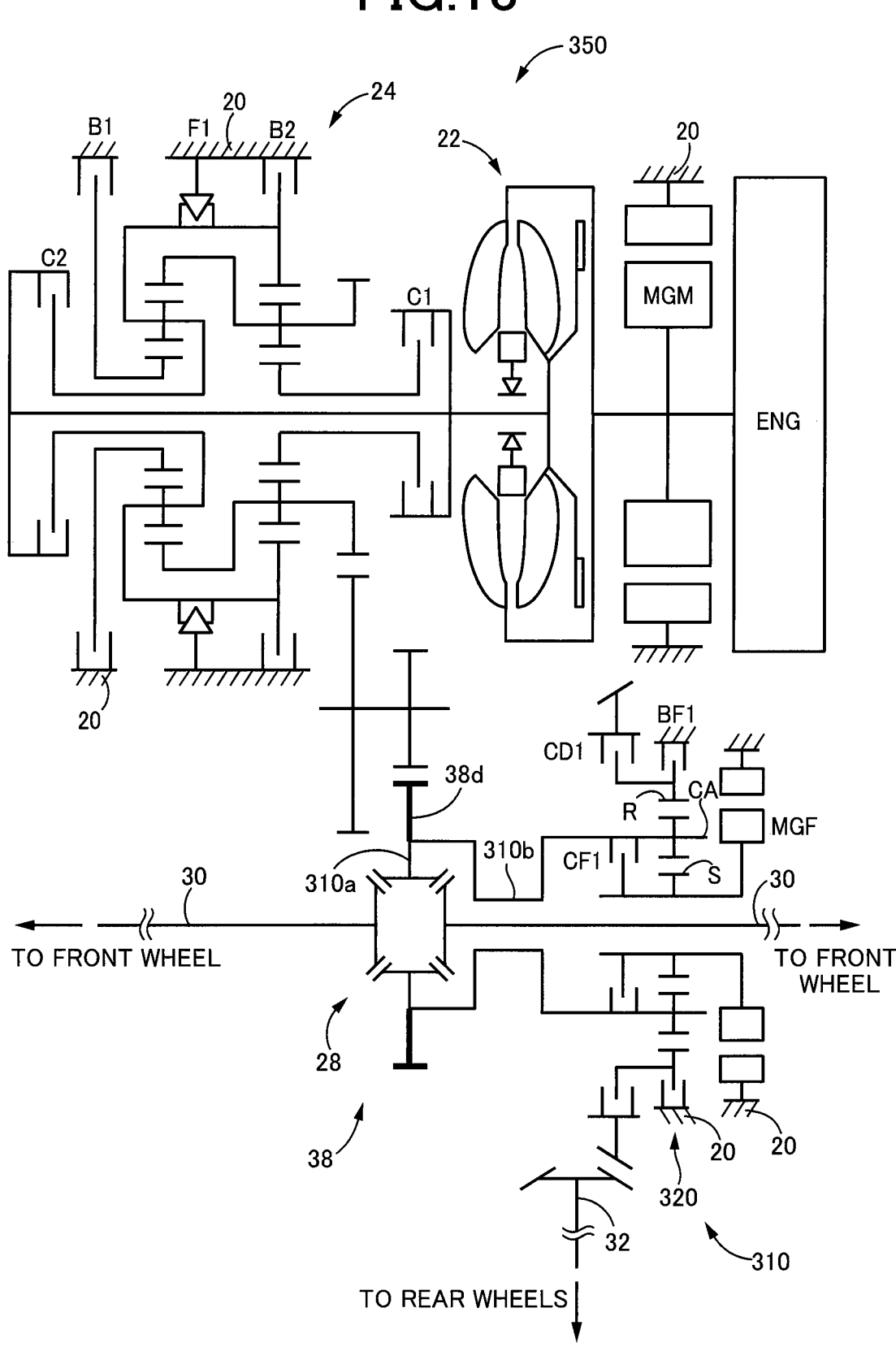
FIG. 13 is a view schematically showing a construction of a power transmission device according to a sixth embodiment of the present invention.

FIG. 13 is a view schematically showing a construction of a power transmission device 350 according to a sixth embodiment of the present invention. The power transmission device 350 is mainly different from the power transmission device 300 of FIG. 10 in the above-described fifth embodiment, in terms of a position of the front differential device 28. However, the power transmission device 350 is substantially the same as the power transmission device 300 in terms of connection relationship between members, the collinear chart relating to the transfer 310 shown in FIG. 11 and the table relating to the transfer 310 shown in FIG. 12.

In the power transmission device 350, positions of the TF rotating machine MGF and the front differential device 28 are switched to each other, as compared with the power transmission device 300 shown in FIG. 10. In the power transmission device 350, the TF input gear 38d, the front differential device 28 and the transfer 310 are disposed sequentially in the axial direction of the transfer 310 that is parallel to the pair of front drive shafts 30. The TF input gear 38d and the front differential device 28 are disposed in respective positions overlapping with each other in a radial direction of the pair of front drive shafts 30, i.e., in a direction perpendicular to the axial direction of the pair of front drive shafts 30. In other words, the TF input gear 38d and the front differential device 28 are arranged such that their axial positions parallel to the pair of front drive shafts 30 overlap with each other. It is noted that, in FIG. 13, the TF input gear 38d is represented by thick lines, for indicating the TF input gear 38d clearly.

As described above, as in the above-described fifth embodiment, in the present sixth embodiment, the driving apparatus 10 in which the transfer 310 is disposed laterally can be made compact in size. Further, it is possible to switch between the AWD and the 2WD, and to simplify the construction for cutting off the power transmission to the rear propeller shaft 32.

While the preferred embodiments of this invention have been described in detail by reference to the drawings, it is to be understood that the invention may be otherwise embodied.

For example, in the above-described embodiments, the above-described one of the pair of front wheels 14 and the pair of rear wheels 16 is constituted by the pair of front wheels 14, while the other of the pair of front wheels 14 and the pair of rear wheels 16 is constituted by the pair of rear wheels 16. However, this is not essential. For example, the present invention is applicable also to a vehicle in which a power source, a differential device and a transfer are disposed on side of a pair of rear wheels so that a power of the power source is to be transmitted toward a pair of front wheels through a propeller shaft. In such a vehicle, one of the pair of front wheels and the pair of rear wheels that is constituted by right and left wheels between which the power is to be distributed by the differential device, is constituted by the pair of rear wheels, while the other of the pair of front wheels and the pair of rear wheels is constituted by the pair of front wheels.

In the above-described embodiments, the switching clutch CD1, TF clutch CF1 and TF brake BF1 do not have to be necessarily provided but may be omitted. In this case, in the driving apparatus 10, the AWD running is enabled in the "FIRST POWER SOURCE TORQUE SPLIT" mode of the number m5.

In the above-described embodiments, each of the differential mechanisms 40, 220, 320 does not have to be necessarily constituted by the planetary gear device, but may be constituted by any of other differential mechanisms each of which includes three rotary elements so as to be capable of providing the differential effect.

In the above-described embodiments, the first power source PU1 does not have to be constituted necessarily by both of the engine 12 and the TM rotating machine MGM, as long as being constituted by at least one of the engine 12 and the TM rotating machine MGM. Where the first power source PU1 is constituted by only the TM rotating machine MGM, or where a clutch is provided to separate the engine 12 from the power transmission path, the torque converter 22 and the automatic transmission 24 do not necessarily have to be provided. Further, the automatic transmission 24 may be also a known belt-type continuously variable transmission or a synchronous mesh twin shaft parallel axis-type automatic transmission including a known DCT (Dual Clutch Transmission), for example. Moreover, the torque converter 22 may be replaced by other fluid transmission device such as a fluid coupling device without a function of torque boost effect, or may be replaced by a clutch.

It is to be understood that the embodiments described above are given for illustrative purpose only, and that the present invention may be embodied with various modifications and improvements which may occur to those skilled in the art.

NOMENCLATURE OF ELEMENTS

10: vehicle driving apparatus
14: front wheels (one of the pair of front wheels and the pair of rear wheels)
16: rear wheels (the other of the pair of front wheels and the pair of rear wheels)
26; 210; 310: transfer (power distribution device)
28: front differential device (differential device)
30 front drive shafts (drive shafts)
32: rear propeller shaft (propeller shaft)
38d: TF input gear (power transmission member)
220; 320: differential mechanism
CD1: switching clutch (engagement device)
MGF: TF rotating machine (rotating machine)
PUL first power source (power source)
RE1: first rotary element
RE2: second rotary element
RE3: third rotary element

What is claimed is:

1. A driving apparatus for a vehicle that includes a pair of front wheels and a pair of rear wheels, the driving apparatus comprising:

a power source;

a power distribution device configured to distribute a power of the power source between the pair of front wheels and the pair of rear wheels;

a differential device configured to distribute the power between right and left wheels that constitute one of the pair of front wheels and the pair of rear wheels;

a pair of drive shafts configured to transmit the power to the respective right and left wheels; and a propeller shaft configured to transmit the power to the other of the pair of front wheels and the pair of rear wheels;

wherein the power distribution device is provided with a rotating machine and a differential mechanism that includes a first rotary element connected to the rotating machine, a second rotary element connected to the differential device and a third rotary element connected to the propeller shaft, and wherein the power distribution device is disposed to be coaxial with the pair of drive shafts, the driving apparatus further comprising:

a power transmission member which is disposed to be coaxial with the pair of drive shafts, and which is configured to transmit the power of the power source to the third rotary element, and an engagement device configured to selectively connect between the third rotary element and the propeller shaft, and between the third rotary element and the power transmission member, wherein the third rotary element and the propeller shaft are both connected to the power transmission member in an area located between the power distribution device and one of the right and left wheels in an axial direction of the power distribution device.

2. A driving apparatus for a vehicle that includes a pair of front wheels and a pair of rear wheels, the driving apparatus comprising:

a power source;

a power distribution device configured to distribute a power of the power source between the pair of front wheels and the pair of rear wheels;

a differential device configured to distribute the power between right and left wheels that cooperate to constitute one of the pair of front wheels and the pair of rear wheels;

a pair of drive shafts configured to transmit the power to the respective right and left wheels; and a propeller shaft configured to transmit the power to the other of the pair of front wheels and the pair of rear wheels;

wherein the power distribution device is provided with a rotating machine and a differential mechanism that includes a first rotary element connected to the rotating machine, a second rotary element connected to the differential device and a third rotary element connected to the propeller shaft, and wherein the power distribution device is disposed to be coaxial with the pair of drive shafts, the driving apparatus further comprising:

a power transmission member which is disposed to be coaxial with the pair of drive shafts, and which is configured to transmit the power of the power source to the second rotary element, and an engagement device configured to selectively connect between the second rotary element and the differential device, and between the second rotary element and the power transmission member, wherein the second rotary element and the differential device are both connected to the power transmission member in an area located between the power distribution device and one of the right and left wheels in an
axial direction of the power distribution device.

3. A driving apparatus for a vehicle that includes a pair of
front wheels and a pair of rear wheels, the driving apparatus comprising:

a power source;

a power distribution device configured to distribute a
power of the power source between the pair of front
wheels and the pair of rear wheels;

a differential device configured to distribute the power
between right and left wheels that cooperate to consti-
tute one of the pair of front wheels and the pair of rear
wheels:

a pair of drive shafts configured to transmit the power to
the respective right and left wheels; and a propeller shaft configured to transmit the power to the
other of the pair of front wheels and the pair of rear
wheels;

wherein the power distribution device is provided with a
rotating machine and a differential mechanism that includes a first rotary element connected to the rotating
machine, a second rotary element connected to the
differential device and a third rotary element connected
to the propeller shaft, and wherein the power distribution device is disposed to be
coaxial with the pair of drive shafts, the driving apparatus further comprising:

a power transmission member which is disposed to be
coaxial with the pair of drive shafts, and which is
configured to transmit the power of the power source to
the second rotary element, and an engagement device configured to selectively connect
between the third rotary element and the propeller
shaft, wherein the second rotary element and the differential
device are both connected to the power transmission
member in an area located between the power distri-
bution device and one of the right and left wheels in an
axial direction of the power distribution device.

* * * * *